US009768856B2

(12) United States Patent
Eom et al.

(10) Patent No.: US 9,768,856 B2
(45) Date of Patent: Sep. 19, 2017

(54) METHOD AND APPARATUS FOR TRANSMITTING AND RECEIVING SERVICE IN WIRELESS COMMUNICATION SYSTEM

(71) Applicant: Samsung Electronics Co., Ltd., Gyeonggi-do (KR)

(72) Inventors: Chung-Yong Eom, Seoul (KR); Hee-Dong Kim, Gyeonggi-do (KR); Gye-Young Lee, Seoul (KR); Dong-Yun Hawng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 14/298,748

(22) Filed: Jun. 6, 2014

(65) Prior Publication Data
US 2014/0362762 A1 Dec. 11, 2014

(30) Foreign Application Priority Data

Jun. 7, 2013 (KR) .................... 10-2013-0065124

(51) Int. Cl.
*H04B 7/155* (2006.01)
*H04W 88/16* (2009.01)
(Continued)

(52) U.S. Cl.
CPC ..... *H04B 7/15592* (2013.01); *H04L 12/6418* (2013.01); *H04L 67/16* (2013.01);
(Continued)

(58) Field of Classification Search
CPC . H04B 7/15592; H04L 12/6418; H04L 67/16; H04N 21/237; H04N 21/43615; H04N 21/64322
See application file for complete search history.

(56) References Cited

U.S. PATENT DOCUMENTS 6,167,513 A * 12/2000 Inoue .................. H04L 63/0428
380/255
6,847,634 B1 1/2005 Pearce et al.
(Continued)

FOREIGN PATENT DOCUMENTS

| EP | 2000915 A2 | 12/2008 |
|---|---|---|
| EP | 2000915 A9 | 3/2009 |
| KR | 10-2014-0093477 A | 7/2014 |

OTHER PUBLICATIONS

Extended European Search Report dated Oct. 30, 2014 in connection with European Patent Application No. 14171410.5; 7 pages.

*Primary Examiner* — Bunjob Jaroenchonwanit

(57) ABSTRACT

A method for sending a service by a first gateway (GW) among multiple GWs includes, upon reception of a request for a service from a terminal, determining whether the first GW is able to provide the service, detecting a second GW that is able to provide the service requested by the terminal among the multiple GWs based on GW management information that includes respective service information regarding services that the multiple GWs are able to provide, if the first GW is not able to provide the service, requesting the second GW to provide the service requested by the terminal, and upon reception of the service from the second GW, forwarding the service to the terminal. The other embodiments, including a gateway and a terminal are also disclosed.

40 Claims, 20 Drawing Sheets

(51) Int. Cl.
*H04L 29/08* (2006.01)
*H04N 21/436* (2011.01)
*H04N 21/237* (2011.01)
*H04N 21/643* (2011.01)
*H04L 12/64* (2006.01)

(52) U.S. Cl.
CPC ..... *H04N 21/237* (2013.01); *H04N 21/43615* (2013.01); *H04N 21/64322* (2013.01); *H04W 88/16* (2013.01)

(56) References Cited

U.S. PATENT DOCUMENTS

| | | | |
|---|---|---|---|
| 7,010,109 B2 | 3/2006 | Gritzer et al. | |
| 7,315,886 B1 * | 1/2008 | Meenan | H04L 63/126 709/212 |
| 7,460,510 B2 | 12/2008 | Olivier et al. | |
| 7,580,402 B2 | 8/2009 | Masuhiro et al. | |
| 7,782,826 B2 | 8/2010 | Olivier et al. | |
| 7,961,886 B2 * | 6/2011 | Tiwari | H04K 3/43 380/277 |
| 8,230,004 B2 | 7/2012 | Igarashi | |
| 8,254,837 B2 | 8/2012 | Tian et al. | |
| 8,504,042 B2 | 8/2013 | Chien et al. | |
| 8,547,912 B1 * | 10/2013 | Breau | H04W 8/26 370/329 |
| 2003/0073406 A1 * | 4/2003 | Benjamin | G08G 1/0962 455/41.1 |
| 2003/0091028 A1 | 5/2003 | Chang et al. | |
| 2004/0215749 A1 | 10/2004 | Tsao | |
| 2004/0215820 A1 * | 10/2004 | Blair | H04L 12/2876 709/238 |
| 2005/0123115 A1 | 6/2005 | Gritzer et al. | |
| 2005/0198040 A1 | 9/2005 | Cohen et al. | |
| 2007/0214241 A1 * | 9/2007 | Song | H04L 12/4625 709/219 |
| 2008/0215736 A1 * | 9/2008 | Astrom | H04L 29/06027 709/226 |
| 2009/0080400 A1 | 3/2009 | Olivier et al. | |
| 2009/0222514 A1 | 9/2009 | Igarashi | |
| 2010/0128730 A1 * | 5/2010 | Wang | H04L 65/1083 370/395.1 |
| 2010/0232441 A1 * | 9/2010 | Verma | H04L 12/2809 370/401 |
| 2010/0273417 A1 | 10/2010 | Tian et al. | |
| 2011/0107379 A1 | 5/2011 | Lajoie et al. | |
| 2011/0296481 A1 | 12/2011 | Cholas et al. | |
| 2012/0052863 A1 * | 3/2012 | Chien | H04W 4/203 455/436 |
| 2014/0165121 A1 * | 6/2014 | Dang | H04L 65/4084 725/109 |
| 2015/0134763 A1 * | 5/2015 | Balakrishnan | G06F 9/44505 709/208 |

* cited by examiner

METHOD AND APPARATUS FOR TRANSMITTING AND RECEIVING SERVICE IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application No. 10-2013-0065124 filed on Jun. 7, 2013 in the Korean Intellectual Property Office, the entire disclosure of which is incorporated hereby incorporated by reference.

TECHNICAL FIELD

The present disclosure relates to a method and apparatus for transmitting and receiving services in a wireless communication system.

BACKGROUND

In common home networks, many devices for providing services have respective connectivity depending on the use of different protocols. The devices may be classified into Internet Protocol (IP) devices and non-IP devices, the IP devices supporting IP based protocols while the non-IP devices supporting non-IP based protocols, such as Zigbee™, Z-Wave™, Bluetooth™, and the like.

In general, a home gateway (GW) having centralized control over the devices is used in the home network. The home GW may have limitations on services to be provided and devices to be connected. Accordingly, a problem arises that a terminal connected to the home GW has no choice but to use only particular services that the home GW can provide.

The home GW needs to be connected to a device that supports a new protocol different from the protocol the home GW supports, in order to provide the terminal with various services according to various protocols. In order for the home GW to be connected to the device that supports the new protocol, the home GW needs to be connected to a GW connected to the device. Therefore, a new GW needs to be additionally installed for the home GW to provide various services according to various protocols.

Meanwhile, in conventional home network environments, there is no connectivity among multiple GWs. Thus, even if the new GW is additionally installed, the terminal has to request a service from respective GWs to use them. For example, to use all the services provided by the multiple GWs, the terminal has to use respective User Interfaces (UIs) and interfacing means like remote controllers. This increases service use cost and causes inconvenience in the use of the services.

Furthermore, since the multiple GWs are physically separated from one another, it is impossible to secure service availability for continuing to offer a service to the terminal. For example, if a first GW among the multiple GWs becomes unable to provide a service to the terminal, it is impossible for a second GW different from the first GW to offer the service to the terminal for the first GW. In another example, if the first GW connected to an IP device cannot offer a service, it is impossible for another GW that is able to perform IP communication to be connected to the IP device. Accordingly, a need exists for a scheme to operate multiple GWs in a unified way to keep securing service availability.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object The present disclosure provides a method and apparatus for transmitting and receiving services in a wireless communication system.

The present disclosure also provides a method and apparatus for providing various services to a terminal in a wireless communication system.

The present disclosure also provides a method and apparatus for operating multiple GWs in a unified way in a wireless communication system to secure service availability.

Furthermore, the present disclosure provides a method and apparatus for enabling a terminal to keep receiving a service even when the terminal is located indoors or even outdoors in a wireless communication system.

In accordance with an aspect of the present disclosure, a method for sending a service by a first gateway (GW) among multiple GWs in a wireless communication system is provided. The method includes, upon reception of a request for a service from a terminal, determining whether the first GW is able to provide the service, detecting a second GW that is able to provide the service requested by the terminal among the multiple GWs based on GW management infoiniation that includes respective service information regarding services that the multiple GWs are able to provide, if the first GW is not able to provide the service; requesting the second GW to provide the service requested by the terminal; and upon reception of the service from the second GW, forwarding the service to the terminal.

In accordance with another aspect of the present disclosure, a method for receiving a service by a terminal in a wireless communication system is provided. The method includes receiving information regarding a first gateway (GW) from which the terminal receives a service among multiple GWs, requesting a service from the first GW based on the information regarding the first GW, and receiving the service from the first GW, wherein the first GW provides the service to the terminal based on GW management information that includes service information regarding services that the multiple GWs are able to provide.

In accordance with another aspect of the present disclosure, a gateway (GW) among multiple GWs in a wireless communication system is provided. The GW includes a receiver configured to receive a request for a service from a terminal, a controller configured to determine whether the first GW is able to provide the service requested by the terminal, and detect a second GW that is able to provide the service among the multiple GWs based on GW management information that includes respective service information regarding services that the multiple GWs are able to provide, if the first GW is not able to provide the service, a GW interface for requesting the second GW to provide the service requested by the terminal and receiving the service from the second GW, and a transmitter configured to forward the service to the terminal.

In accordance with another aspect of the present disclosure, a terminal in a wireless communication system is provided. The terminal includes a transmitter, a receiver configured to receive information regarding a first gateway (GW) from which the terminal receives a service among multiple GWs, and a controller configured to control the transmitter to request a service from the first GW based on information regarding the first GW and control the receiver to receive the service from the first GW, wherein the first GW is configured to provide the service to the terminal based on GW management information that includes service information regarding services that the multiple GWs are able to provide.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
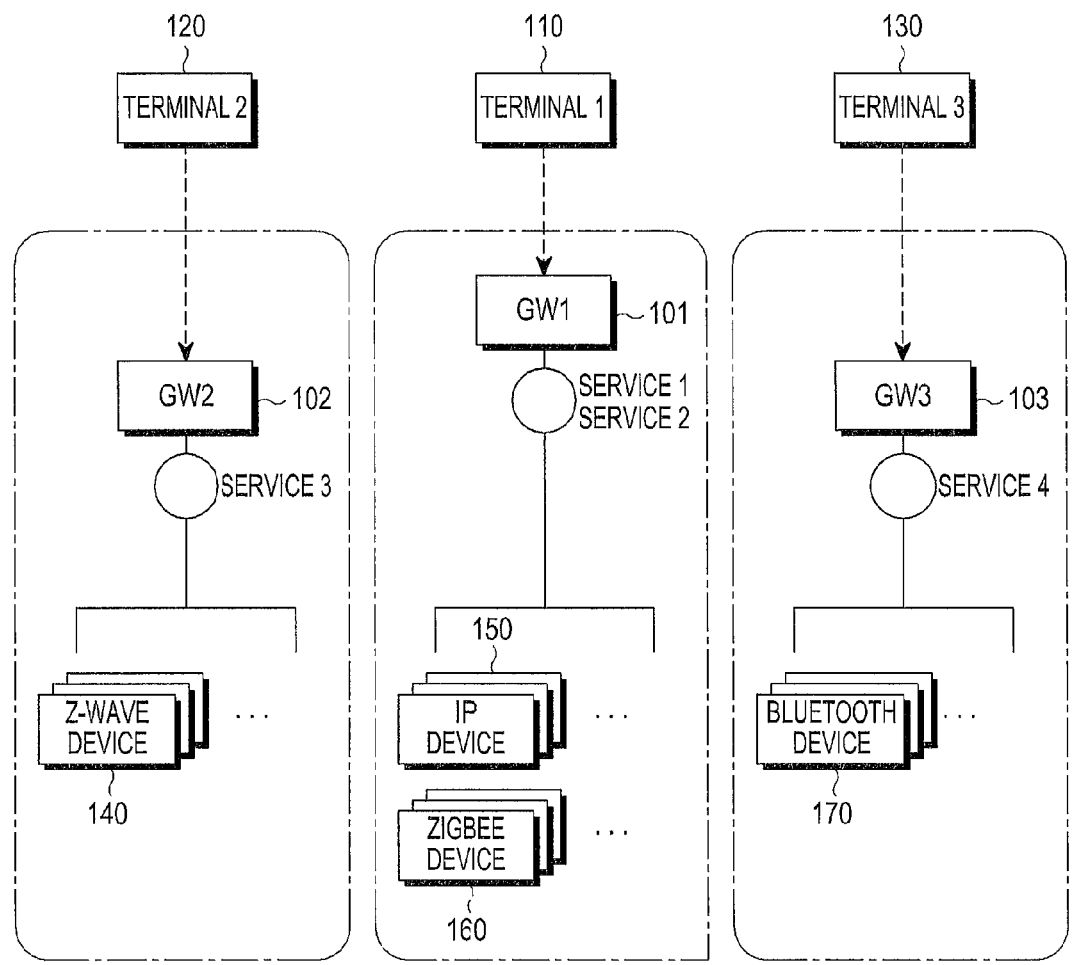
FIG. 1 shows a configuration of a wireless communication system.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Embodiments of the disclosure now will be described more fully hereinafter with reference to the accompanying drawings, in which the illustrative embodiments of the disclosure are shown. The embodiments may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the embodiments of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the embodiments of the present disclosure. As used herein, the singular forms "a", "an" and "the" are intended to include the plural forms as well, unless the context clearly indicates otherwise. It will be further understood that the terms "comprises" and/or "comprising," when used in embodiments of the present disclosure, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure provides a method for transmitting and receiving services in a wireless communication system. Various embodiments that enable multiple gateways (GWs) to be operated in a unified way to provide services to a terminal will now be described in detail.

Prior to describing the embodiments of the present disclosure, a wireless communication system will be described first.

FIG. 1 shows a configuration of a wireless communication system.

Referring to FIG. 1, a wireless communication system includes a terminal 1 110, a terminal 2 120, a terminal 3 130, a GW 1 101, a GW 2 102, a GW 3 103, a Z-Wave device 140, an Internet Protocol (IP) device 150, a Zigbee device 160, and a Bluetooth device 170.

The terminals 1 to 3 110, 120, and 130 are connected to the GWs 1 to 3 101 to 103, respectively, for receiving services from them. The GWs 1 to 3 101 to 103 are connected to different devices and provide different services.

Specifically, the terminal 1 110 is connected to the GW 1 101 and receives a service through the GW 1 101. For example, provided that the GW 1 101 provides services 1 and 2, the terminal 1 110 requests at least one of the services 1 and 2 from the GW 1 101. The terminal 1 110 receives and uses requested one of the services 1 and 2 from the GW 1 101.

The GW 1 101 is located between the terminal 1 110 and devices (i.e., the IP device 150 and Zigbee device 160). In response to the request of the terminal 1 110 for at least one of the services 1 and 2, the GW 1 101 sends the corresponding service request to at least one of the IP device 150 and the Zigbee device 160. In return, the GW 1 101 can receive a corresponding service from the at least one of the IP device 150 and the Zigbee device 160, and then forward the corresponding service to the terminal 1 110.

The IP device 150 is a device based on an IP protocol, providing the service 1 according to the IF protocol at the request of the GW 1 101.

The Zigbee device 160 is a device based on a Zigbee protocol, providing the service 2 according to the Zigbee protocol at the request of the GW 1 101.

The terminal 2 120 is connected to the GW 2 102 and receives a service through the GW 2 102. For example, provided that the GW 2 102 provides service 3, the terminal 2 120 requests the service 3 from the GW 2 102. The terminal 2 120 then receives and uses the service 3.

The GW 2 102 is located between the terminal 2 120 and the Z-Wave device 140. Upon receiving a request of the terminal 2 120 for the service 3, the GW 2 102 requests a corresponding service from the Z-wave device 140. In return, the GW 2 102 can receive the corresponding service from the Z-Wave device 140, and then forward the corresponding service to the terminal 2 120.

The Z-Wave device 140 is a device based on the Z-Wave protocol, providing the service 3 according to a Z-Wave protocol at the request of the GW 2 102.

The terminal 3 130 is connected to the GW 3 103 and receives a service through the GW 3 103. For example, provided that the GW 3 103 provides service 4, the terminal 3 130 requests the service 4 from the GW 3 103. The terminal 3 130 receives and uses the service 4 from the GW 3 103.

The GW 3 103 is located between the terminal 3 130 and the Bluetooth device 170. Upon receiving a request of the terminal 3 for the service 4, the GW 3 103 requests a corresponding service from the Bluetooth device 170. In return, the GW 3 103 can receive the corresponding service from the Bluetooth device 170, and then forward the corresponding service to the terminal 3 130.

The Bluetooth device 170 is a device based on a Bluetooth protocol, providing the service 4 according to the Bluetooth protocol at the request of the GW 3 103.

As shown in FIG. 1, the GWs 1 to 3 102 to 103 are physically separated from one another, and each have no choice but provide a particular protocol-based service according to a connected device. Therefore, to use a particular protocol-based service, each of the terminals 1 to 3 110, 120, and 130 has inconvenience of having to individually access each of the GWs 1 to 3 101, 102, and 103. For example, the terminal 1 110 has to access the GW 3 103 to use a Bluetooth-based service; and the terminal 3 130 has to access the GW 1 101 to use an IP-based service.

Considering the aforementioned problem, a method can be used to enable one of the GWs 1 to 3 101, 102, and 103 to provide various services (e.g., services 1 to 4) all to the terminal 1 110. Such a method, however, costs too much and increases overload of the GW due to providing the various services.

Accordingly, to solve the problem as mentioned above, embodiments of the present invention provide a method and apparatus for incorporating multiple GWs to provide services.

A configuration of a wireless communication system in accordance with an embodiment of the present disclosure will now be described in connection with FIG. 2.

Figure 2:
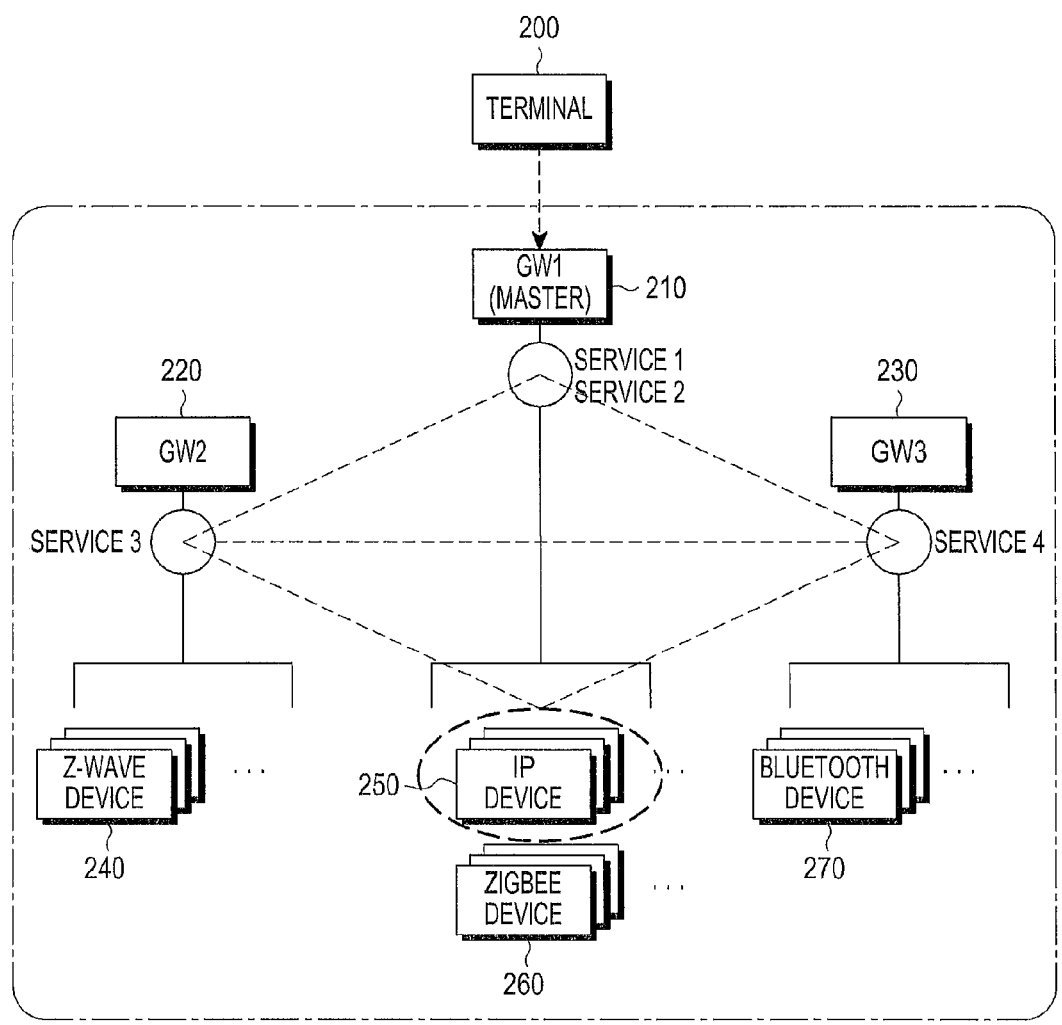
FIG. 2 shows a configuration of a wireless communication system, according to an embodiment of the present disclosure.

FIG. 2 shows a configuration of a wireless communication system, according to an embodiment of the present disclosure.

The wireless communication system can be configured in the form of a home network. It is assumed herein that the wireless communication system is a home network.

Referring to FIG. 2, the wireless communication system includes a terminal 200, a GW 1 210, a GW 2 220, a GW 3 230, a Z-Wave device 240, an Internet Protocol (IP) device 250, a Zigbee device 260, and a Bluetooth device 270.

The terminal 200 can receive all services provided by the GW1 210, GW2 220, GW3 230 through the GW1 210, which is designated as a master GW. The master GW, one of the interconnected multiple GWs (i.e., GW 1 210 connected to GW 2 220 and GW3 230) included in the home network, represents a GW for performing information management and routing operation on the corresponding GWs.

Although GW 1 210 is taken as the master GW in the embodiment of FIG. 2, any one of the GW 2 220 and GW 3 230 can be the master GW. Criteria for deciding the master GW can be predetermined priorities of the GWs, IP numbers of the GWs, and transmit signal strengths of the GWs, etc. Based on the criteria, the master GW can be one of the multiple GWs in the home network having the highest priority; having the greatest IP number; having the strongest transmit signal strength; or having the highest electric power supplied.

GW 1 210, GW 2 220, and GW 3 230 support different services and access different devices. For example, GW 1 210 supports service 3 and accesses the Z-wave device 240. GW 2 220 supports services 1 and 3, and accesses the IP device 250 and Zigbee device 260. Furthermore, GW 3 230 supports service 4 and accesses the Bluetooth device 270.

The IP device 250 is a device based on an IP protocol, providing the service 1 according to the IP protocol. The Zigbee device 260 is a device based on a Zigbee protocol, providing the service 2 according to the Zigbee protocol. The Z-Wave device 240 is a device based on a Z-Wave protocol, providing the service 3 according to the Z-Wave protocol. The Bluetooth device 270 is a device based on a Bluetooth protocol, providing the service 4 according to the Bluetooth protocol.

GWs 1 to 3 210, 220, and 230 can be connected based on IP and share respective service information they support (hereinafter, referred to as 'supported service information') and respective information regarding connected devices (hereinafter, referred to as 'connectivity information'). Sharing operation for the information can be performed periodically.

In the meantime, the respective supporting service information and connectivity information of the GW 2 220 and GW 3 230 can be managed by the master GW, GW 1 210. Accordingly, once the terminal 200 requests at least one of services 1 to 4, GW 1 210 can determine which GW can provide the requested service. Connected to all the other GWs in the home network, the GW 1 210 can send a service request to a corresponding GW and forward a service received from the GW to the terminal 200.

In the meantime, since the GW 2 220 and GW 3 230 each have IP-based connectivity, even if GW 1 210 is powered off, it can be connected to the IP device 250. If the GW 1 210 is powered off, one of the GW 2 220 and GW 3 230 can be determined as a new master GW.

Although three GWs are shown in the embodiment of FIG. 2, the number of GWs is not limited thereto but can vary differently.

Internal structure of the terminal 200 and the GWs 1 to 3 210, 220, and 230 will now be described in connection with FIGS. 3 to 5.

First, the internal structure of the terminal 200 will be described with reference to FIG. 3.

Figure 3:
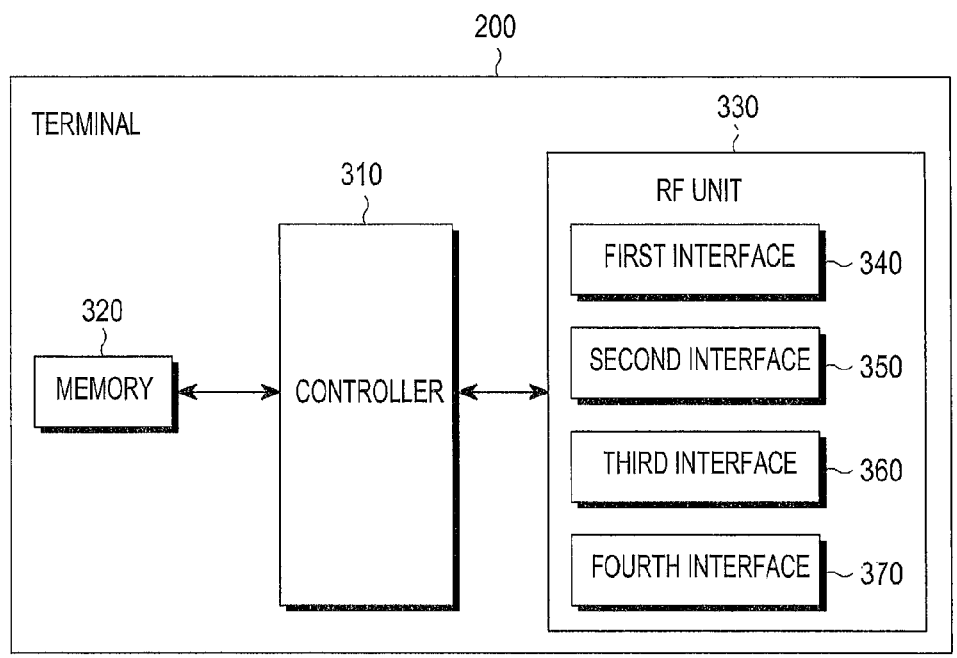
FIG. 3 is a block diagram of a terminal, according to an embodiment of the present disclosure.

FIG. 3 is a block diagram of the terminal 200, according to an embodiment of the present disclosure.

Referring to FIG. 3, the terminal 200 can include a controller 310, a memory 320, and a Radio Frequency (RF) unit 330.

The controller 310 can control the memory 320 and the RF unit 330, and control overall operations of the terminal 200. Especially, the controller 310 can control operations of the terminal 200 in accordance with embodiments of the present disclosure.

The memory 320 can store various information created during operations of the terminal 200. For example, the memory 320 can store information relating to services received from the master GW, GW 1 210.

The RF unit 330 is an element for wireless communication of the terminal 200, including various communication interfaces, such as a first interface 340 for IP communication, a second interface 350 for Zigbee communication, a third interface 360 for Bluetooth communication, and a fourth interface 370 for Z-Wave communication.

The RF unit 330 can send a service request message to the GW 1 210 and receive the requested service from the GW 1 210. The RF unit 330 can also exchange various information with the GW 1 210.

Next, internal structure of a GW in accordance with an embodiment of the present disclosure will now be described with reference to FIG. 4. The internal structure of a GW 400 as shown in FIG. 4 can correspond to that of one of the GWs 1 to 3 210, 220, and 230.

Figure 4:
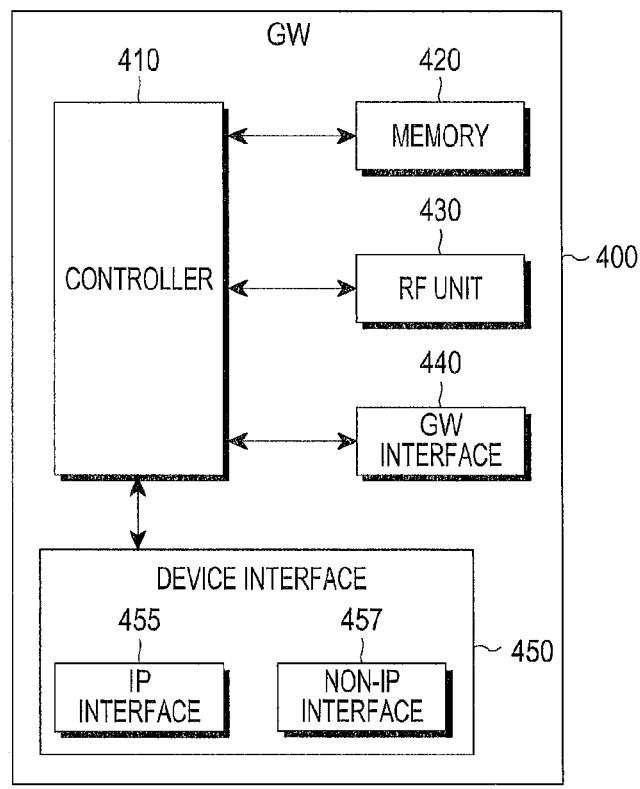
FIG. 4 is a block diagram of a gateway (GW), according to an embodiment of the present disclosure.

FIG. 4 is a block diagram of the GW 400, according to an embodiment of the present disclosure.

Referring to FIG. 4, the GW 400 can include a controller 410, a memory 420, an RF unit 430, a GW interface 440, and a device interface 450.

The memory 420 can be configured in the form of a database. The memory 420 can store supporting service information and connectivity information received from multiple GWs in a home network, as well as supporting service information and connectivity information of the GW 400.

The RF unit 430 is an element for performing communication with the terminal 200, exchanging various information with the terminal 200. For example, the RF unit 430 can receive a service request message from the terminal 200 and in response, send a corresponding service to the terminal 200.

The GW interface 440 is an element for performing communication with the multiple GWs. The GW interface 440 can send the supporting service information and connectivity information of the GW 400 to the multiple GWs, and receive respective supporting service information and connectivity information from the multiple GWs. The GW interface 440 can be configured based on IP, and can be, for example, an interface that uses Smart Home Protocol (SHP). If the GW 400 may not be able to provide the service requested from the terminal 200, the GW interface 440 can send a request for the service to any of the multiple GWs that can be able to support the requested service and in return receive the service from the corresponding GW.

The device interface 450 is an element for performing communication with at least one device. The device can include an IP interface 455 for performing communication with IP-based devices and a non-IP interface 457 for performing communication with non-IP (e.g., Zigbee, Bluetooth, and Z-wave) based devices. The non-IP interface 457 can take the non-IP based device as an IP-based device by performing communication with the non-IP based device using a virtual IP.

The controller 410 can control the memory 420, the RF unit 430, the GW interface 440, and the device interface 450, and control general operations of the GW 400. The controller 410 can perform different operations depending on whether the GW 400 is a mater GW or not. Specific operations for the master GW and non-master GW will be described later in detail.

Figure 5:
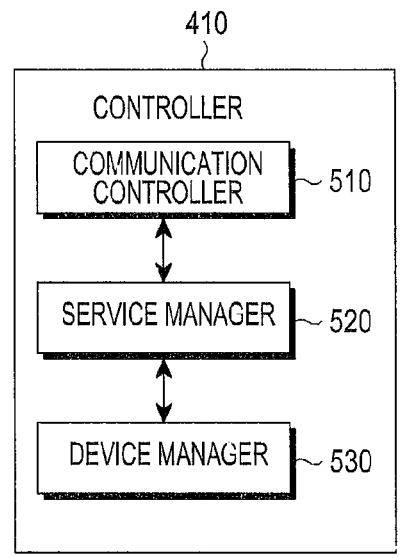
FIG. 5 shows a block diagram of a controller included in a GW, according to an embodiment of the present disclosure.

The controller 410 can be configured as shown in FIG. 5.

FIG. 5 shows a block diagram of the controller 410 included in a GW, according to an embodiment of the present disclosure.

Referring to FIG. 5, the controller 410 can include a communication controller 510, a service manager 520, and a device manager 530.

The communication controller 510 can control the GW 400 to communicate with the terminal 200 and the multiple GWs by controlling the RF unit 430 and the GW interface 440.

The service manager 520 can manage various services to be provided for the terminal 200. The service manager 520 can also manage supporting respective service information and connectivity information of multiple GWs stored in the memory 420, as well as supporting service information and connectivity information of the GW 400. The service manager 520 can determine a GW that can be able to provide a service requested by the terminal 200 based on the information stored in the memory 420, and provide the terminal 200 with a service through the determined GW.

The device manager 530 can manage at least one device connected to the GW 400 by controlling the device interface 450.

Multiple GWs interconnected to share information and provide services in accordance with embodiments of the present disclosure will now be described in connection with FIG. 6.

Figure 6:
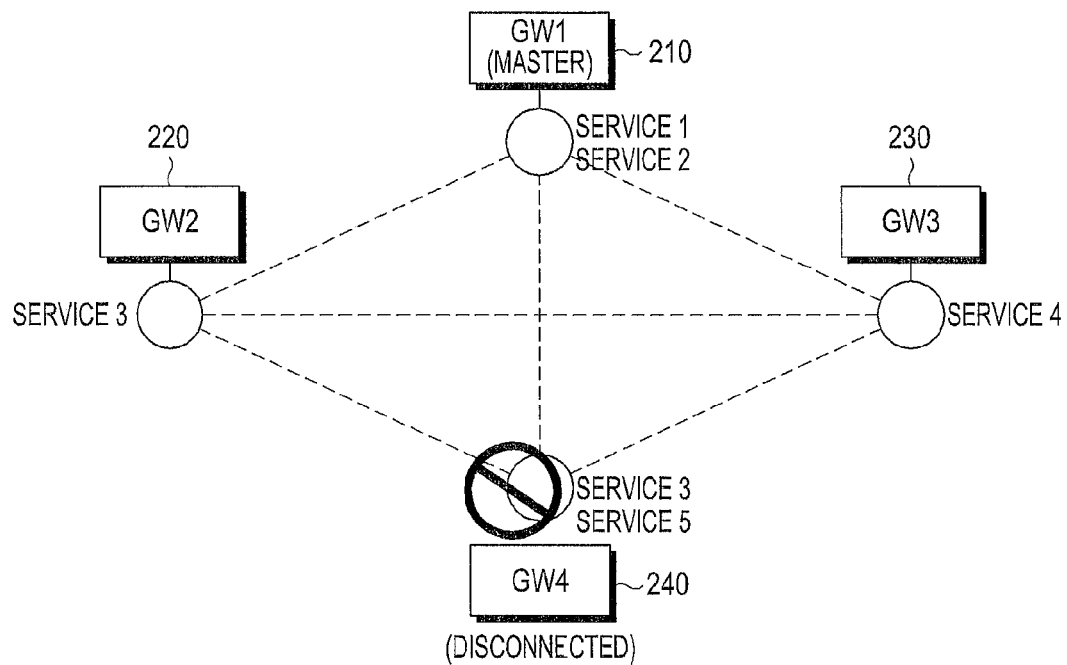
FIG. 6 shows multiple GWs connected in a wireless communication system, according to an embodiment of the present disclosure.

FIG. 6 shows multiple GWs interconnected in a wireless communication system, according to an embodiment of the present disclosure.

The wireless communication system of FIG. 6 is configured to have a form in which GW 4 240 is additionally included in addition to the GW 1 210, GW 2 220, GW 3 230 of the wireless communication system of FIG. 2.

The GWs 1 to 4 210, 220, 230, and 240 are interconnected on the IP basis, and communicate each other while being powered on. Additionally, the GWs 1 to 4 210, 220, 230, and 240 and devices connected to the GWs 1 to 4 210, 220, 230, and 240 have to be registered in a home service by e.g., authentication and identity (ID) registration procedure. One of the GWs 1 to 4 210, 220, 230, and 240 can be designated as a master GW. In FIG. 6, it is assumed that GW 1 210 is the master GW. In order for GWs 1 to 4 210, 220, 230, and 240 to perform communication, the master GW, GW1 210, can detect GWs 2 to 4 220, 230, and 240. The GW 1 210 can use a common service discovery scheme to detect the GWs 2 to 4 220, 230, and 240. The service discovery scheme can be a scheme for detecting a particular device using a multicast protocol, such as managed Data Network Service (mDNS), for example. Additionally, the GW 1 210 can separately use a particular protocol for security when security is to be taken into account for the service discovery scheme.

If the wireless communication system uses Universal Plug and Play (UPnP), the GW 1 210 can detect only GWs (e.g., GWs 2 and 3 220 and 230), which are powered on and connected to the home network. In this regard, the GW 1 210 may not detect the GW 4 240 which is powered off, or powered on but disconnected from the home network. In this case, the GW 1 210 can manage the GW 4 240 as not being connected to the home network or as being powered off.

Once the GW 2 220 and GW 3 230 are detected, the GW 1 210 can establish connections with the GW 2 220 and GW 3 230. As such, when connections among GWs have been established, the GW 1 210 can notify the GW 2 220 and GW 3 230 of its own supporting service information and connectivity information. The GW 1 210 can then receive respective supporting information and connectivity information of the GW 2 220 and GW 3 230 from the GW 2 220 and GW 3 230.

The GW 1 210 can manage information per GW, as represented in Table 1. Table 1 represents an example of GW management.

TABLE 1

| GW type | Supporting Service Information (Service Capability) | Connectivity Information (Connectivity) | Status Information (Status) |
|---|---|---|---|
| GW 1 (210) | Services 1 and 2 | Zigbee, HAP/SEP/ZLL | ON |
| GW 2 (220) | Service 3 | Z-Wave | ON |
| GW 3 (230) | Service 4 | Bluetooth | ON |
| GW 4 (240) | Services 3 and 5 | Particular Protocol | OFF |
| ... | ... | ... | ... |

Referring to Table 1, it is seen that GWs 1 to 4 210, 220, 230, and 240 have different supporting service information, connectivity information, and status information. In Table 1, the status information per GW can be represented as "ON" or "OFF", wherein "ON" indicates that the GW is powered on and connected to a home network while "OFF" indicates that the GW is powered off or that the GW is powered on but disconnected from the home network. In other words, "ON" indicates that the GW is able to provide the service while "OFF" indicates that the GW is unable to provide the service.

Referring to Table 1, respective information regarding the GWs will be given as follows. Specifically, it is seen that the GW 1 210 can provide services 1 and 2, be connected to Zigbee protocol (Home Automation certified Products (HAP)/Smart Energy Profile (SEP)/Zigbee Light Link (ZLL)) based devices, and be connected to a home network while being powered on.

It is also seen that the GW 2 220 can provide service 3, be connected to Z-Wave protocol based devices, and be connected to the home network while being powered on. In addition, it is seen that the GW 3 230 can provide service 4, be connected to Bluetooth protocol based devices, and be connected to the home network while being powered on.

Furthermore, it is seen that the GW 4 240 can provide services 3 and 5, be connected to particular protocol based devices, the particular protocol being identical to or different from at least one of the Zigbee protocol, Z-Wave protocol, and Bluetooth protocol, and be powered off or not connected to the home network although powered on.

Similar to the GW 1 210, each of the GW 2 220 and GW 3 230 can exchange its supporting service information and connectivity information with a GW connected thereto, and manage information similar to what is shown in Table 1.

As such, multiple GWs in accordance with embodiments of the present disclosure can share respective supporting service information and connectivity information of GWs registered in the home service. Accordingly, it can be possible for the multiple GWs to provide a corresponding service to the terminal 200 by intercommunication.

Next, a method for providing services by sharing information among GWs will now be described in detail with reference to FIGS. 7 to 10.

A procedure of sharing information among GWs in a wireless communication system as configured in FIG. 6 will be described first.

Figure 7:
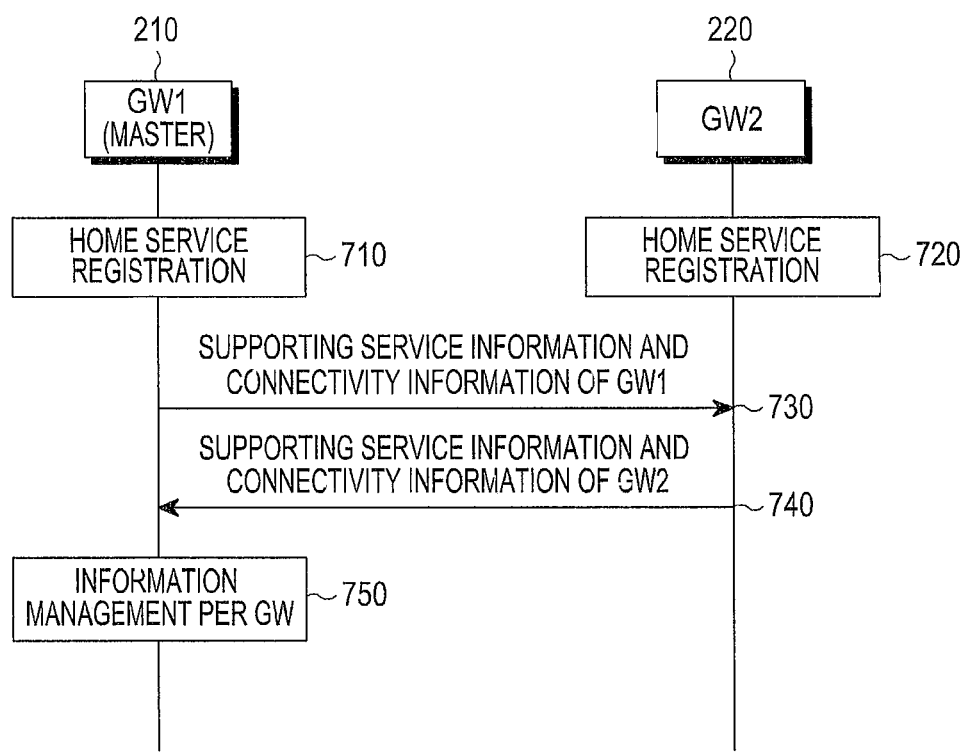
FIG. 7 is a signaling chart illustrating a procedure of sharing information between multiple GWs in a wireless communication system, according to an embodiment of the present disclosure.

FIG. 7 is a signaling chart illustrating a procedure of sharing information between multiple GWs in a wireless communication system, according to an embodiment of the present disclosure.

Although operations between the GW 1 210, which is a master GW, and the GW 2 220 are mainly described as an example in the embodiment of FIG. 7, it will be appreciated that the GW 2 220 can be replaced by any GW, which is a non-master GW, such as GW 3 230.

Referring to FIG. 7, in operations 710 and 720, the GW 1 210 and GW 2 220 are registered in a home service, respectively. The reason for registering the GW 1 210 and GW 2 220 in the home service is that sharing the respective supporting service information and connectivity information can be done between only GWs registered in the home service. However, this is not essential for embodiments of the present disclosure, but can be optional or can vary differently depending on embodiments of the present disclosure.

In operation 730, the GW 1 210 can send its supporting service information and connectivity information to the GW 2 220. The supporting service information and connectivity information of the GW 1 210 can be broadcast to all GWs registered in the home service.

Upon receiving the supporting service information and connectivity information of the GW 1 210 from the GW 1 210, the GW 2 220 can send its supporting service information and connectivity information to the GW 1 210, in operation 740.

Upon receiving the supporting service information and connectivity information of the GW 2 220 from the GW 2 220, the GW 1 210 can store and manage the supporting service information and connectivity information of the GW 2 220 as well as the supporting service information and connectivity information of the GW 1 210, in operation 750. Information per GW can be stored and managed in the form as represented in Table 1.

A method for providing a service to a terminal after the procedure of sharing information between GWs as shown in FIG. 7 will now be described with reference to FIG. 8.

Figure 8:
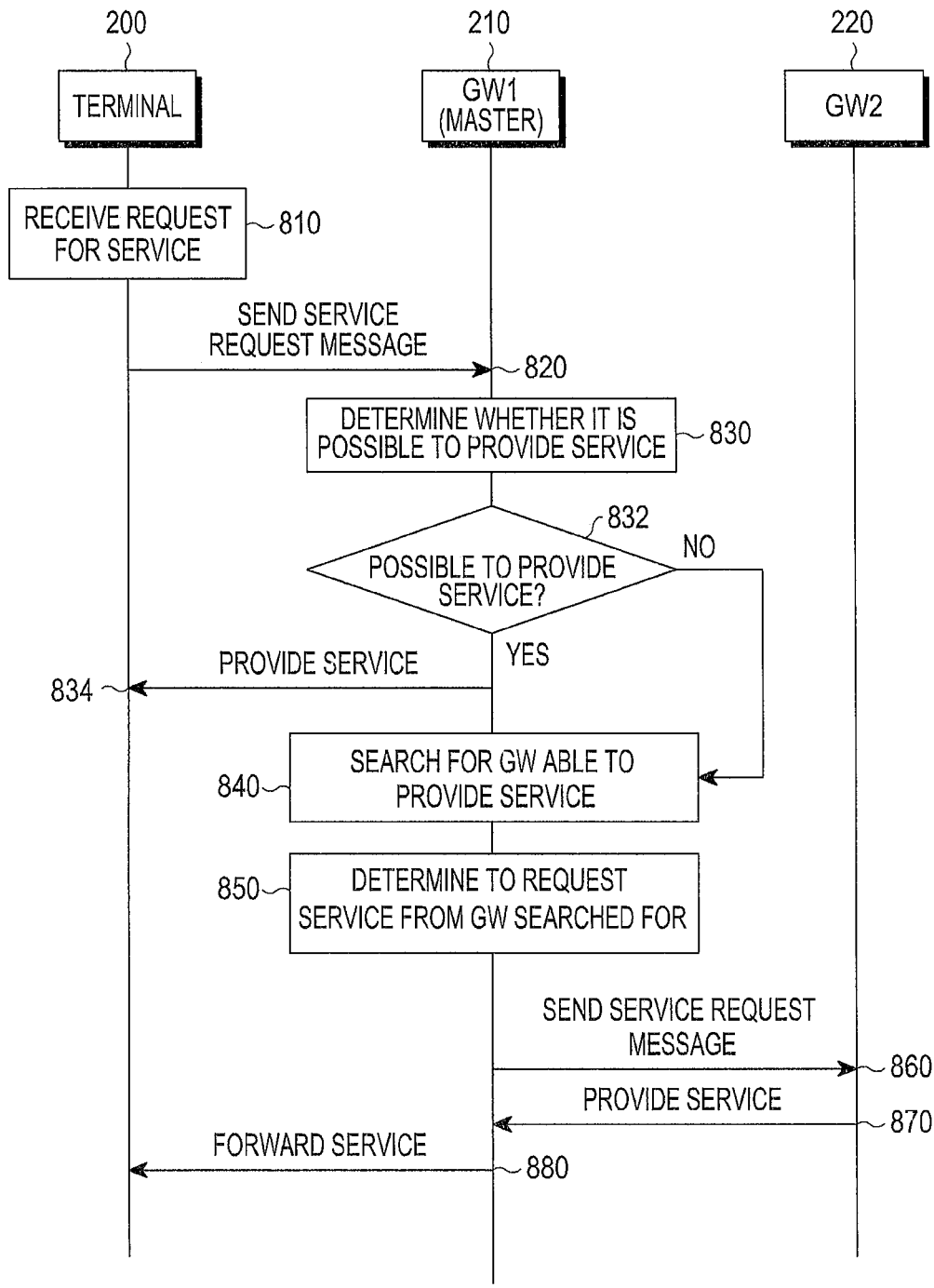
FIG. 8 is a signaling chart illustrating a procedure of providing a service to a terminal in a wireless communication system, according to an embodiment of the present disclosure.

FIG. 8 is a signaling chart illustrating a procedure of providing a service to a terminal in a wireless communication system, according to an embodiment of the present disclosure.

Referring to FIG. 8, upon receiving a request for a service from the user in operation 810, the terminal 200 can send a service request message to the GW 1 210 asking for the service requested by the user in operation 820.

Receiving the service request message, the GW 1 210 can determine whether the GW 1 210 can be able to provide the service requested by the terminal 200 in operation 830. If it is determined that the GW 1 210 can be able to provide the service requested by the terminal 200 in operation 832, the GW 1 210 can provide the service to the terminal 200 in operation 834.

Otherwise, if it is determined that the GW 1 210 may not be able to provide the service requested by the terminal 200 in operation 832, the GW 1 210 can search for a GW that can be able to provide the service requested by the terminal 200 based on the GW management table as represented by Table 1 in operation 840. For example, if the terminal requests service 3, the GW 1 210 can search for a GW that can be able to provide the service 3 among multiple GWs based on the GW management table. If the GW 2 220 is searched for as the GW that can be able to provide the service 3, the GW 1 210 can determine to request the service from the GW 2 220 in operation 850.

Subsequently, the GW 1 210 can send a service request message to the GW 2 220 requesting the service (e.g., service 3) from the GW 2 220 in operation 860.

If the GW 1 210 is offered the service from the GW 2 220 in response to the service request message in operation 870, the GW 2 210 can forward the service offered from the GW 2 220 to the terminal 200 in operation 880.

As described above, embodiments of the present disclosure have an advantage of using not only the service provided by a GW connected to the terminal 200 but also various services of other GWs.

Operations of the terminal 200 and master GW 1 210, as shown in FIG. 8 will be described in detail with reference to FIGS. 9 and 10, respectively.

Figure 9:
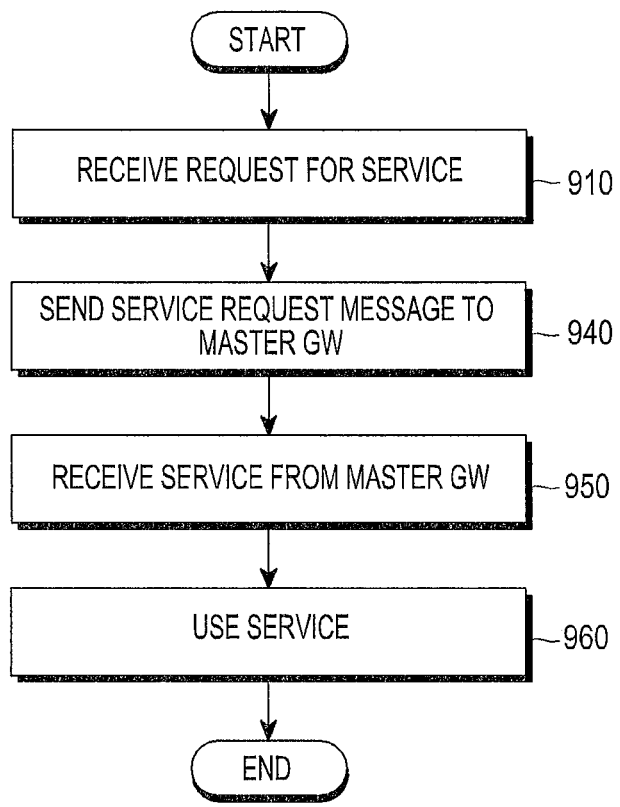
FIG. 9 is a flowchart illustrating operations of a terminal receiving a service in a wireless communication system, according to an embodiment of the present disclosure.

FIG. 9 is a flowchart illustrating operations of the terminal 200 receiving a service in a wireless communication system, according to an embodiment of the present disclosure.

Referring to FIG. 9, the terminal 200 can receive a request for a service from the user in operation 910. The terminal 200 can send a service request message to the GW 1 210 requesting the GW 1 210 to provide the service requested by the user in operation 940. The terminal 200 can then receive the service from the GW 1 210 in operation 950. The terminal 200 can use the service in operation 960.

Figure 10:
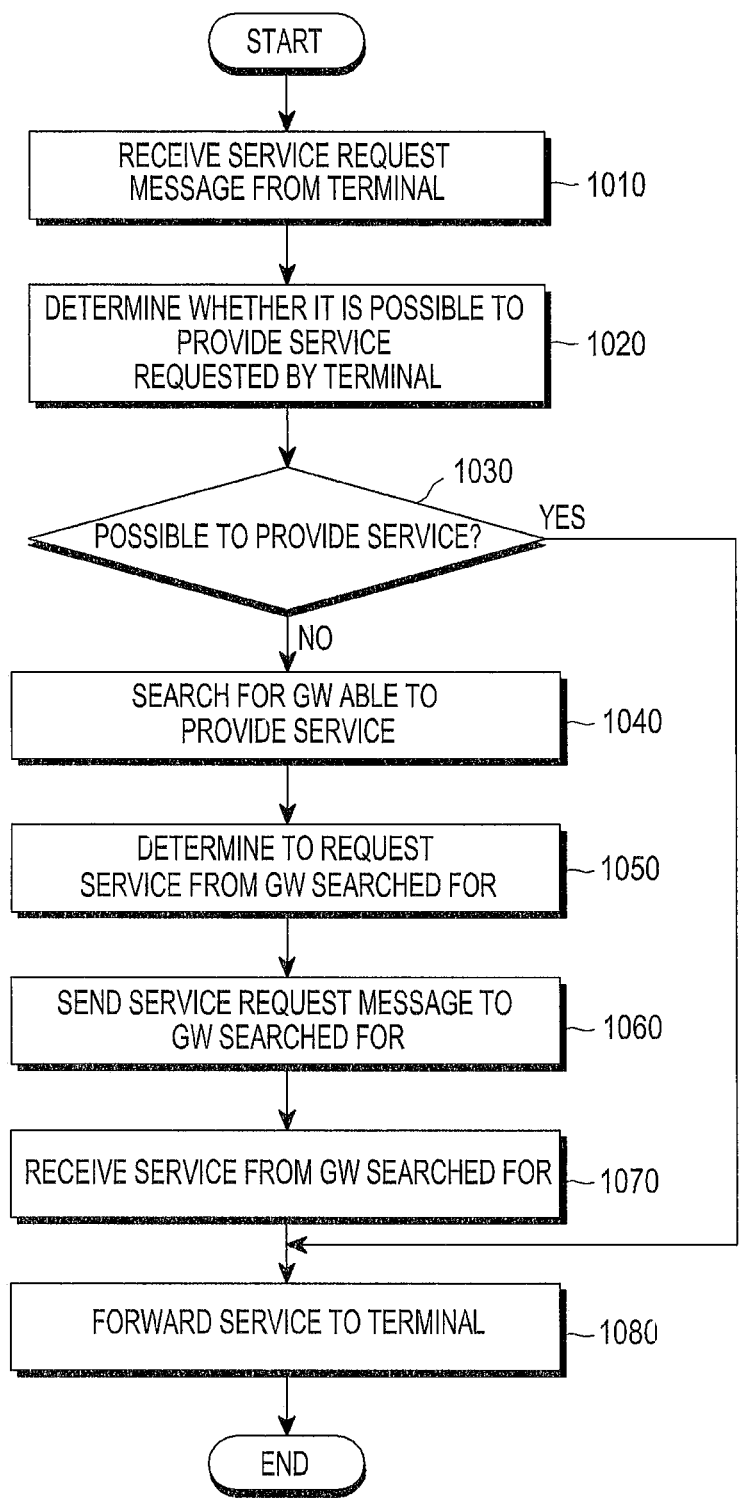
FIG. 10 is a flowchart illustrating operations of a master GW providing a service in a wireless communication system, according to an embodiment of the present disclosure.

FIG. 10 is a flowchart illustrating operations of a master GW providing a service in a wireless communication system, according to an embodiment of the present disclosure.

Referring to FIG. 10, the GW 1 210 can receive the service request message in operation 1010, and determine whether the GW 1 210 can be able to provide the service requested by the terminal 200 in operation 1020. If it is determined that the GW 1 210 can be able to provide the service requested by the terminal 200 in operation 1030, the GW 1 210 can provide the service to the terminal 200 in operation 1080.

Otherwise, if it is determined that the GW 1 210 may not be able to provide the service requested by the terminal 200 in operation 1030, the GW 1 210 can search for a GW that can be able to provide the service requested by the terminal 200 based on the GW management table as represented by Table 1 in operation 1040. For example, if the terminal requests service 3, the GW 1 210 can search for a GW that can be able to provide the service 3 among multiple GWs based on the GW management table. If the GW 2 220 is searched for as the GW that can be able to provide the service 3, the GW 1 210 can determine to request the service of the GW 2 220 in operation 1050.

Subsequently, the GW 1 210 can send a service request message to the GW 2 220 that asks the GW 2 220 for the service, e.g., service 3 in operation 1060.

If the GW 1 210 is offered the service from the GW 2 220 in response to the service request message in operation 1070, the GW 2 210 can forward the service offered from the GW 2 220 to the terminal 200 in operation 1080.

In other embodiments of the present disclosure, how to receive a service in the terminal 200 can depend on whether the terminal 200 is in an indoor space where there is a home network or in an outdoor space. A method for providing a service in case the terminal 200 is located indoors will now be described first.

Figure 11:
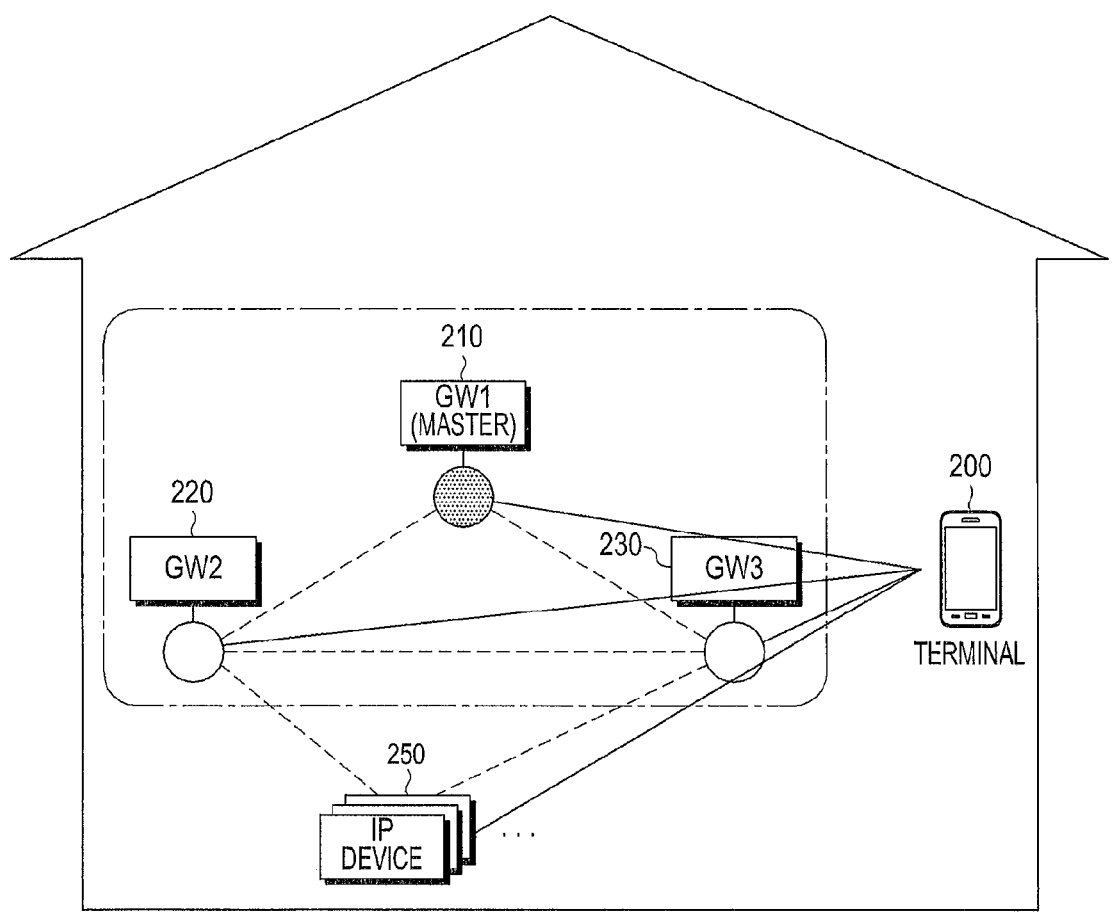
FIG. 11 illustrates an indoor terminal connected to multiple GWs and devices to receive a service in a wireless communication system, according to an embodiment of the present disclosure.

FIG. 11 illustrates an indoor terminal connected to multiple GWs and devices to receive services in a wireless communication system, according to an embodiment of the present disclosure.

In the embodiment of FIG. 11 where the terminal 200 is located indoors, the terminal 200 receives services in the wireless communication system having a configuration of the home network as shown in FIG. 2.

The terminal 200 located indoors can establish connections with the GWs 1 to 3 210, 220, and 230, and the IP device 250 on the IP basis. For example, the terminal 200 can be directly connected to the GWs 1 to 3 210, 220, and 230, and the IP device 250, all of which are capable of IP-based communication. The terminal 200 can store and manage respective information regarding the GWs 1 to 3 210, 220, and 230, and the IP device 250 in a list format.

The terminal 200 can directly request a service from the IP device 250 based on the stored information and in return receive the service. To use a service, such as a service for controlling multiple devices as a group through a particular GW, the terminal 200 can receive the service through at least one of the GWs 1 to 3 210, 220, and 230.

If there are two or more GWs that can provide the service wanted by the terminal 200, the terminal 200 can select one of the two or more GWs and receive the service from the selected GW. Furthermore, if the GW 1 210 as an example of the particular GW, becomes unable to provide services while the terminal 200 is receiving a service associated with the IP device 250 through the GW 1 210, the terminal 200 can receive the service associated with the IP device 250 through another GW, e.g., GW 2 220. Accordingly, availability of the service associated with the IP device 250 can always be secured in the home network.

A method for providing a service to the terminal 200 in an environment as shown in FIG. 11 will now be described in detail with reference to FIG. 12.

Figure 12:
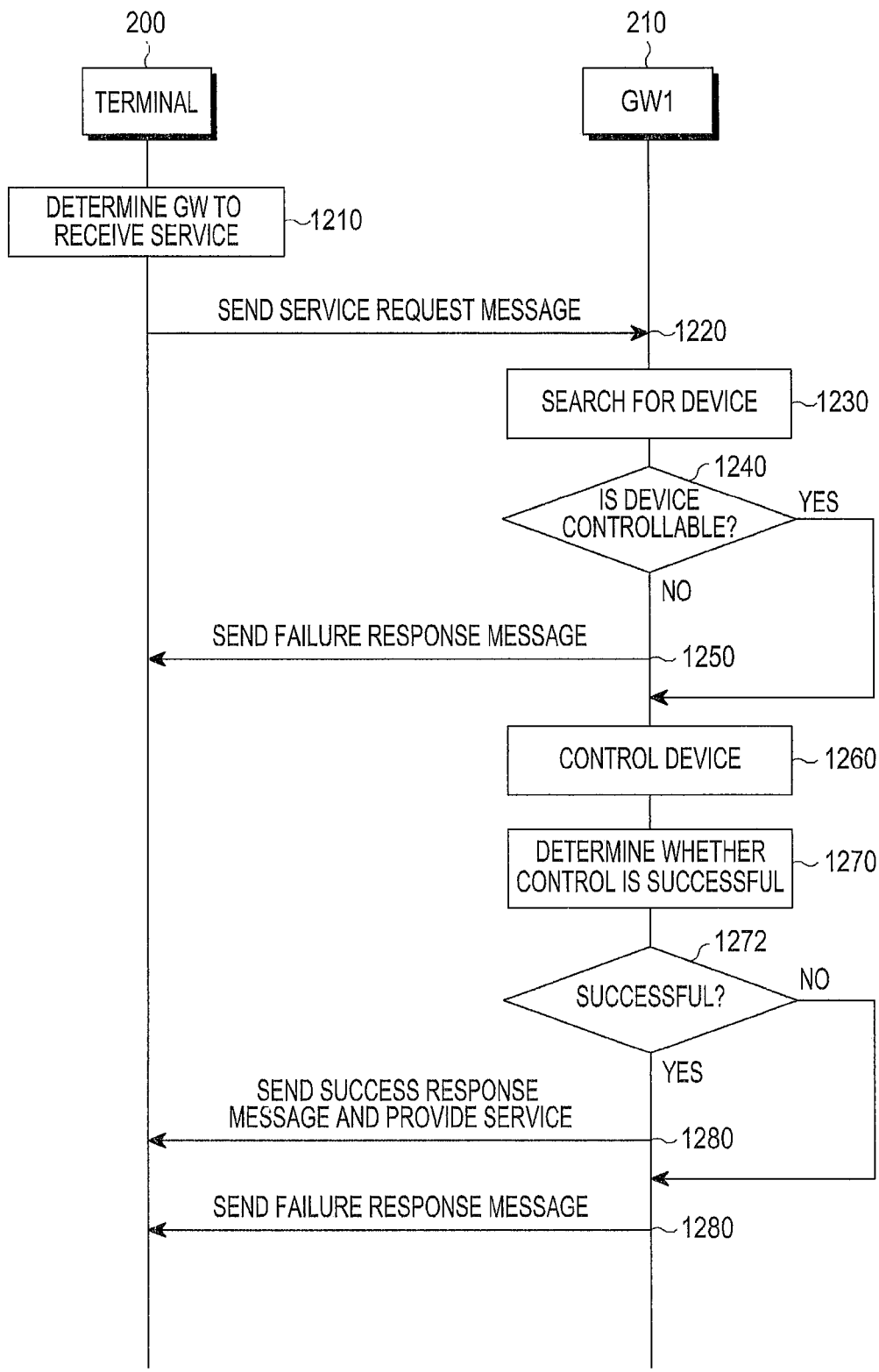
FIG. 12 is a signaling chart illustrating a procedure of providing a service to an indoor terminal in a wireless communication system, according to an embodiment of the present disclosure.

FIG. 12 is a signaling chart illustrating a procedure of providing a service to an indoor terminal in a wireless communication system, according to an embodiment of the present disclosure.

Referring to FIG. 12, the terminal 200 can decide a GW from which to receive a service, in operation 1210. For example, the terminal 200 can select a master GW as the GW from which to receive the service, or select a GW that can be able to provide the service as the GW from which to receive the service based on pre-stored information regarding GWs and devices. In the embodiment of FIG. 12, it is assumed that the GW 1 210 is selected as the GW from which the terminal 200 receives a service. The terminal 200 can send a service request message to the GW 1 210 requesting the GW 1 210 to provide a service, in operation 1220.

Upon reception of the service request message, the GW 1 210 can search for a corresponding device to be controlled to provide the service to the terminal 200, in operation 1230. Then, the GW 1 210 can determine whether the device is controllable, in operation 1240. If it is determined that the device is not controllable, the GW 1 210 can send a failure response message to the terminal 200 indicating that the GW 1 210 can be unable to provide a service associated with the device, in operation 1250.

Otherwise, if it is determined that the device is controllable in operation 1240, the GW 1 210 can control the device in operation 1260. Then, the GW 1 210 can determine whether the device was successfully controlled, in operation 1270. If the device was successfully controlled in operation 1272, the GW 1 210 can send the terminal 200 a success response message indicating that the device was successfully controlled and provide the service to the terminal 200, in operation 1280. If the device was not successfully controlled in operation 1272, the GW 1 210 can send the terminal 200 a failure response message indicating that the device was not successfully controlled, in operation 1290.

Then, the terminal 200 can continue to use the service or request the service from another GW depending on whether it receives the success response message or the failure response message.

Operations of the terminal 200 and GW 1 210 as shown in FIG. 12 will be described in detail with reference to FIGS. 13 and 14, respectively.

Figure 13:
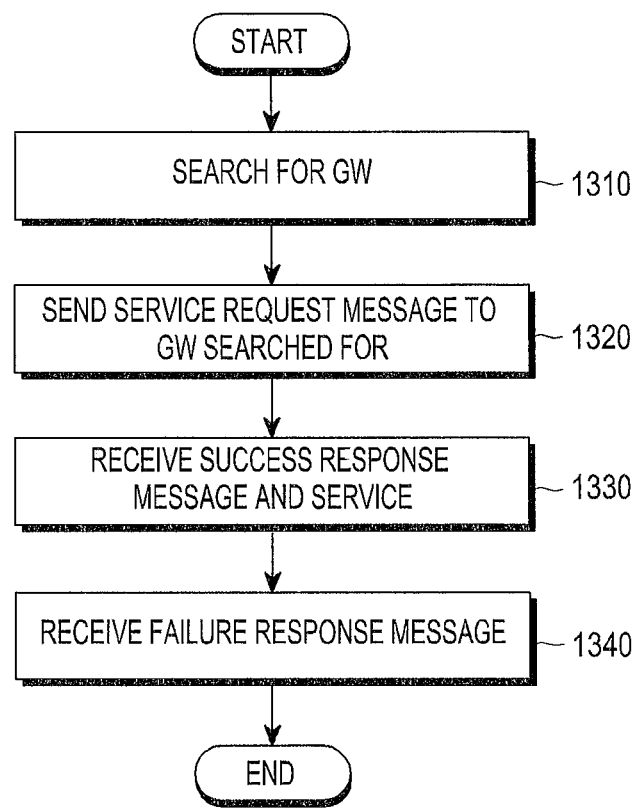
FIG. 13 is a flowchart illustrating operations of an indoor terminal receiving a service in a wireless communication system, according to an embodiment of the present disclosure.

FIG. 13 is a flowchart illustrating operations of an indoor terminal receiving a service in a wireless communication system, according to an embodiment of the present disclosure.

Referring to FIG. 13, the terminal 200 can decide a GW from which to receive a service, in operation 1310. For example, the terminal 200 can select a master GW as the GW from which to receive the service, or select a GW that can be able to provide the service as the GW from which to receive the service based on pre-stored information regarding GWs and devices.

The terminal 200 can send a service request message to the GW 1 210 requesting the GW 1 210 to provide a service, in operation 1320.

In return, the terminal 200 can receive a success response message and the service from the GW 1 210 in operation 1330. The terminal 200 can then use the service. On the other hand, if the terminal 200 receives a failure response message from the GW 1 210 in operation 1340, the terminal 200 can request the service from another GW.

Figure 14:
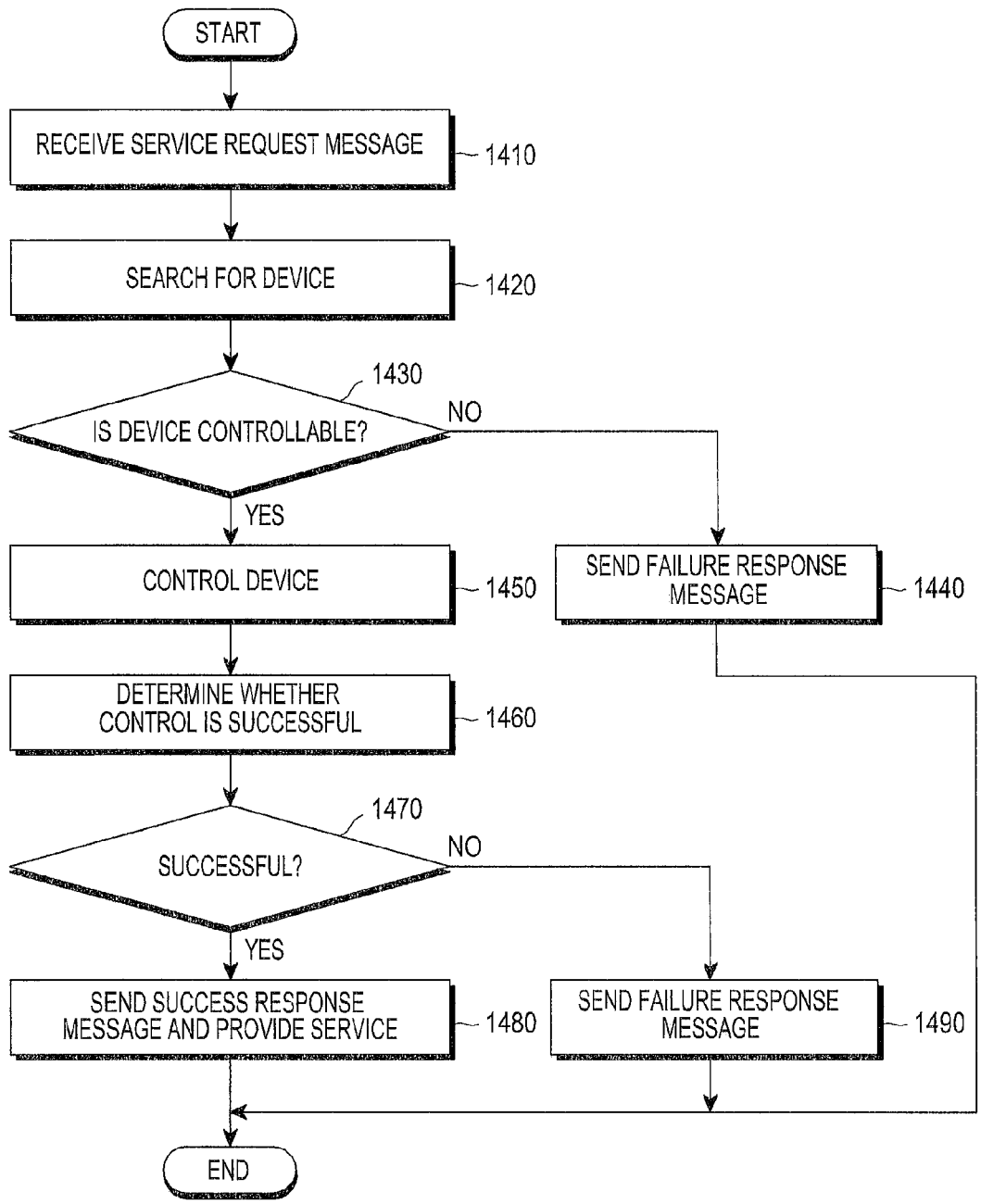
FIG. 14 is a flowchart illustrating operations of a GW providing a service to an indoor terminal in a wireless communication system, according to an embodiment of the present disclosure.

FIG. 14 is a flowchart illustrating operations of a GW providing a service to an indoor terminal in a wireless communication system, according to an embodiment of the present disclosure.

Although operations of the GW 1 210 are described in the embodiment of FIG. 14, it should be understood that such operations are not limited to the GW 1 210 but can be performed by any GW within the home network that receives a request for a service from the terminal 200.

Referring to FIG. 14, the GW 1 210 can receive a service request message from the terminal 200, in operation 1410.

Upon reception of the service request message, the GW 1 210 can search for a corresponding device to be controlled to provide the service to the terminal 200, in operation 1420. Then, the GW 1 210 can determine whether the device is controllable, in operation 1430. If it is determined that the device is not controllable, the GW 1 210 can send a failure response message to the terminal 200 that indicates that the GW 1 210 can be unable to provide a service associated with the device, in operation 1440.

Otherwise, if it is determined that the device is controllable in operation 1430, the GW 1 210 can control the device in operation 1450. Then, the GW 1 210 can determine whether the device was successfully controlled, in operation 1460. If the GW 1 210 controlled the device successfully in operation 1470, the GW 1 210 can send the terminal 200 a success response message indicating that the device was successfully controlled and provide the service to the terminal 200, in operation 1480. If the GW 1 210 did not control the device successfully in operation 1470, the GW 1 210 can send the terminal 200 a failure response message indicating that the device was not successfully controlled, in operation 1490.

Thus far, a case where the terminal 200 is located indoors has been examined. In the following description, an occasion where the terminal 200 is located outdoors will be described.

Figure 15:
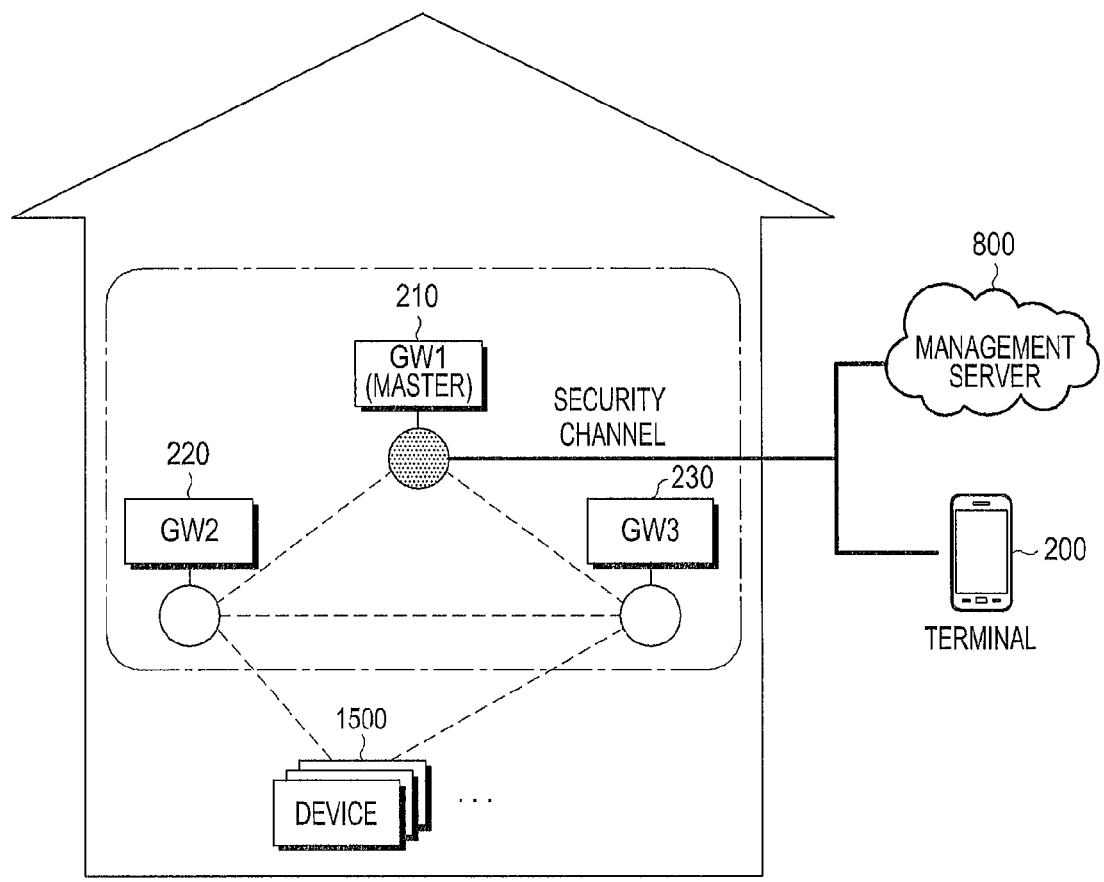
FIG. 15 illustrates an outdoor terminal connected to a master GW to receive a service in a wireless communication system, according to an embodiment of the present disclosure.

FIG. 15 illustrates an outdoor terminal connected to a master GW to receive a service in a wireless communication system, according to an embodiment of the present disclosure.

In the embodiment of FIG. 15 where the terminal 200 is located outdoors, the terminal 200 receives a service in the wireless communication system having the configuration of the home network as shown in FIG. 2.

Referring to FIG. 15, a management server 800 can be connected to the master GW via a security channel, and send information regarding the master GW to the terminal 200. The terminal 200 located outdoors can then receive the information regarding the master GW from the management server 800 and make connection with the master GW, which is the GW 1 210, on a security channel. The terminal 200 can request a service from the GW 1 210 on the security channel, and receive the service from the GW 1 210.

A method for providing a service to the terminal 200 in an environment as shown in FIG. 15 will now be described in detail with reference to FIG. 16.

Figure 16:
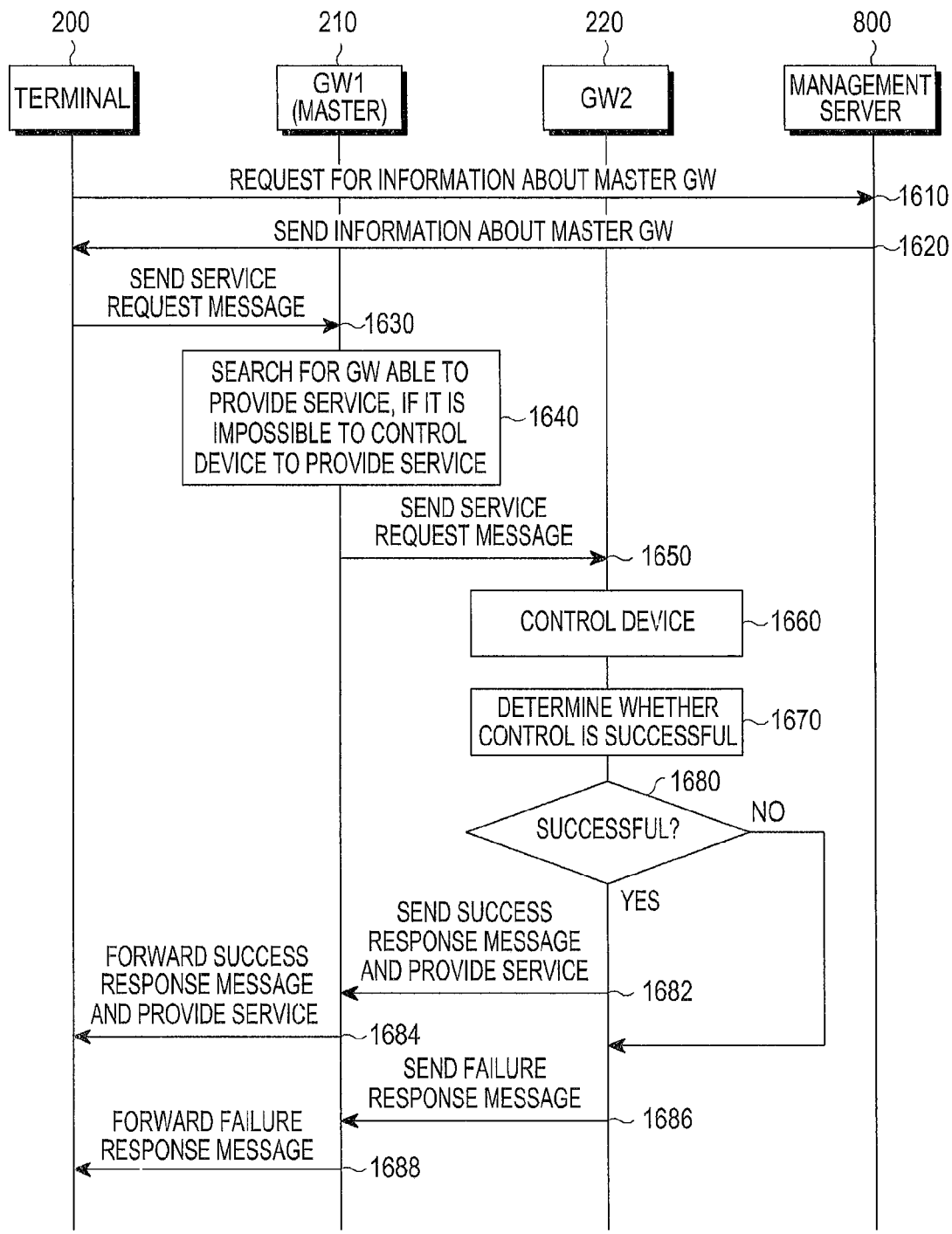
FIG. 16 is a signaling chart illustrating a procedure of providing a service to an outdoor terminal in a wireless communication system, according to an embodiment of the present disclosure.

FIG. 16 is a signaling chart illustrating a procedure of providing a service to an outdoor terminal in a wireless communication system, according to an embodiment of the present disclosure.

Referring to FIG. 16, if the terminal 200 is located outdoors, the terminal 200 can request information regarding the master GW from the management server 800 to use a service requested by the user, in operation 1610. In response, the management server 800 can send the terminal 200 information regarding the GW 1 210 as the information regarding the master GW. The information regarding the GW 1 210 can include e.g., an address of the GW 1 210.

In operation 1630, the terminal 200 can send a service request message to the GW 1 210 requesting the GW 1 210 to provide a service, based on the information regarding the GW 1 210. Upon reception of the service request message, the GW 1 210 can determine whether it can be able to control a corresponding device connected thereto to provide the service requested by the terminal 200. If it is determined that the GW 1 210 can be able to provide the service, the GW 1 210 can control the corresponding device to provide the service to the terminal 200.

Otherwise, if it is determined that the GW 1 210 may not be able to control the corresponding device to provide the service to the terminal 200 in operation 1640, the GW 1 210 can search for a GW among multiple GWs included in the home network that can be able to provide the service. For example, if a GW searched for is the GW 2 220, the GW 1 210 can send a service request message to the GW 2 220 requesting the GW 2 220 to provide the service, in operation 1650.

In response to the service request message, the GW 2 220 can control a corresponding device to provide the service, in operation 1660. Then, the GW 2 220 can determine whether the device was successfully controlled, in operation 1670. If the device was successfully controlled in operation 1680, the GW 2 220 can send the GW 1 210 a success response message indicating that the device was successfully controlled and provide the service to the GW 1 210, in operation 1682. The GW 1 210 can then receive the success response message and the service, and in operation 1684, forward the success response message and the service to the terminal 200.

On the other hand, if the GW 2 220 did not control the device successfully in operation 1680, the GW 2 220 can send the GW 1 210 a failure response message indicating that the device was not successfully controlled, in operation 1686. The GW 1 210 can then receive the failure response message, and in operation 1688, forward the failure response message to the terminal 200.

The terminal 200 can continue to use the service or request the service from another GW depending on whether it receives the success response message or the failure response message.

Operations of the terminal 200 and GW 1 210 as shown in FIG. 16 will be described in detail with reference to FIGS. 17 and 18, respectively.

Figure 17:
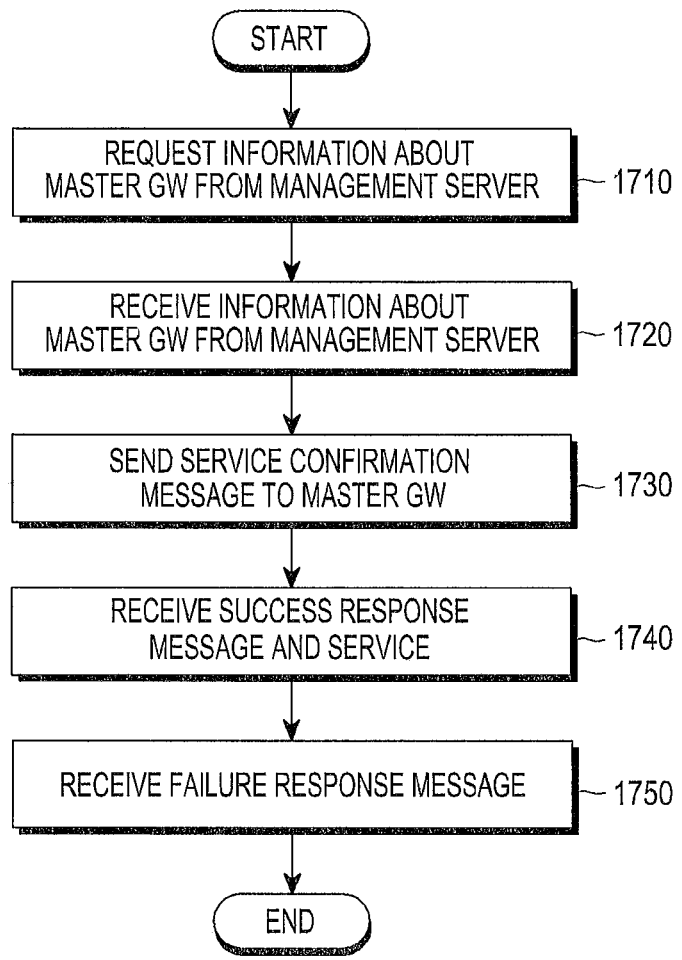
FIG. 17 is a flowchart illustrating operations of an outdoor terminal receiving a service in a wireless communication system, according to an embodiment of the present disclosure.

FIG. 17 is a flowchart illustrating operations of an outdoor terminal receiving a service in a wireless communication system, according to an embodiment of the present disclosure.

Referring to FIG. 17, if the terminal 200 is located outdoors, the terminal 200 can request information regarding the master GW, e.g., the GW 1 210, from the management server 800, to use a service requested by the user, in operation 1710. In return, the terminal 200 can receive the information regarding the master GW from the management server 800, in operation 1720. The information regarding the master GW can include, for example, an address of the master GW. The terminal 200 can send a service request message to the master GW based on the information regarding the master GW in operation 1730.

The terminal 200 can receive a success response message indicating that a corresponding device was successfully controlled as well as a service from the master GW in operation 1740, or receive a failure response message indicating that the device was not successfully controller from the master GW in operation 1750.

Then, the terminal 200 can continue to use the service or request the service from another GW depending on whether it receives the success response message or the failure response message.

Figure 18:
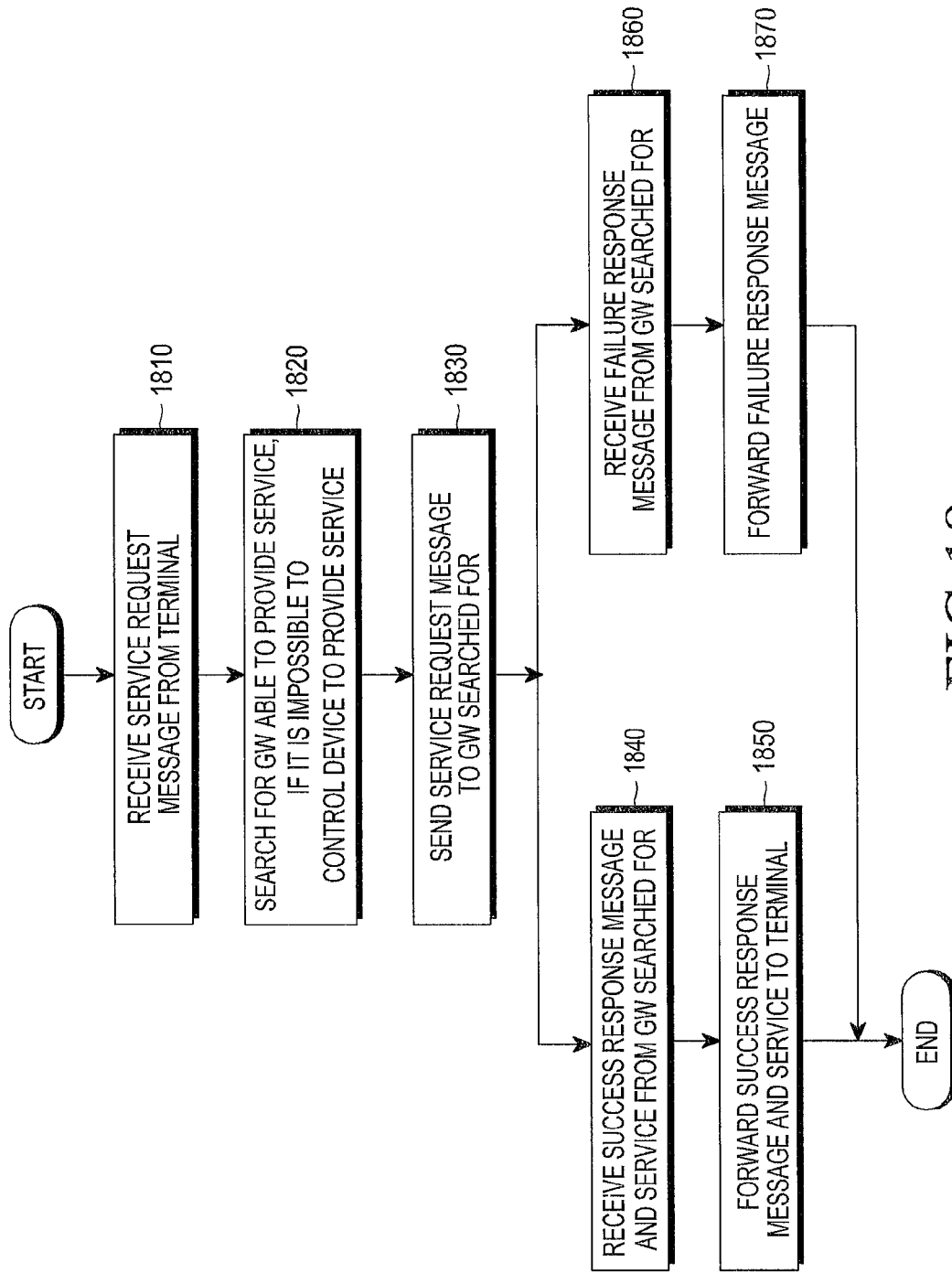
FIG. 18 is a flowchart illustrating operations of a master GW providing a service to an outdoor terminal in a wireless communication system, according to an embodiment of the present disclosure.

FIG. 18 is a flowchart illustrating operations of a master GW providing a service to an outdoor terminal in a wireless communication system, according to an embodiment of the present disclosure.

Referring to FIG. 18, the master GW, which is the GW 1 210 in this example, can receive a service request message from the terminal 200 that asks if the GW 1 200 is able to provide the service. The GW 1 210 can determine whether it can be able to control a corresponding device connected thereto to provide the service requested by the terminal 200. If it is determined that the GW 1 210 can be able to provide the service, the GW 1 210 can control the corresponding device to provide the service to the terminal 200.

Otherwise, if it is determined that the GW 1 210 may not be able to control the corresponding device to provide the service to the terminal 200 in operation 1820, the GW 1 210 can search for a GW among multiple GWs included in the home network that can be able to provide the service. For example, if a GW searched for is the GW 2 220, the GW 1 210 can send a service request message to the GW 2 220 requesting the GW 220 to provide the service, in operation 1830.

If receiving the success response message and the service from the GW 2 220 in operation 1840, the GW 1 210 can forward the success response message and the service to the terminal 200 in operation 1850.

Otherwise, if receiving the failure response message from the GW 2 220 in operation 1860, the GW 1 210 can forward the failure response message to the terminal 200 in operation 1870.

A procedure of the terminal 200 receiving a service when the master GW is changed while the terminal 200 located outdoors is receiving the service will now be described below.

Figure 19:
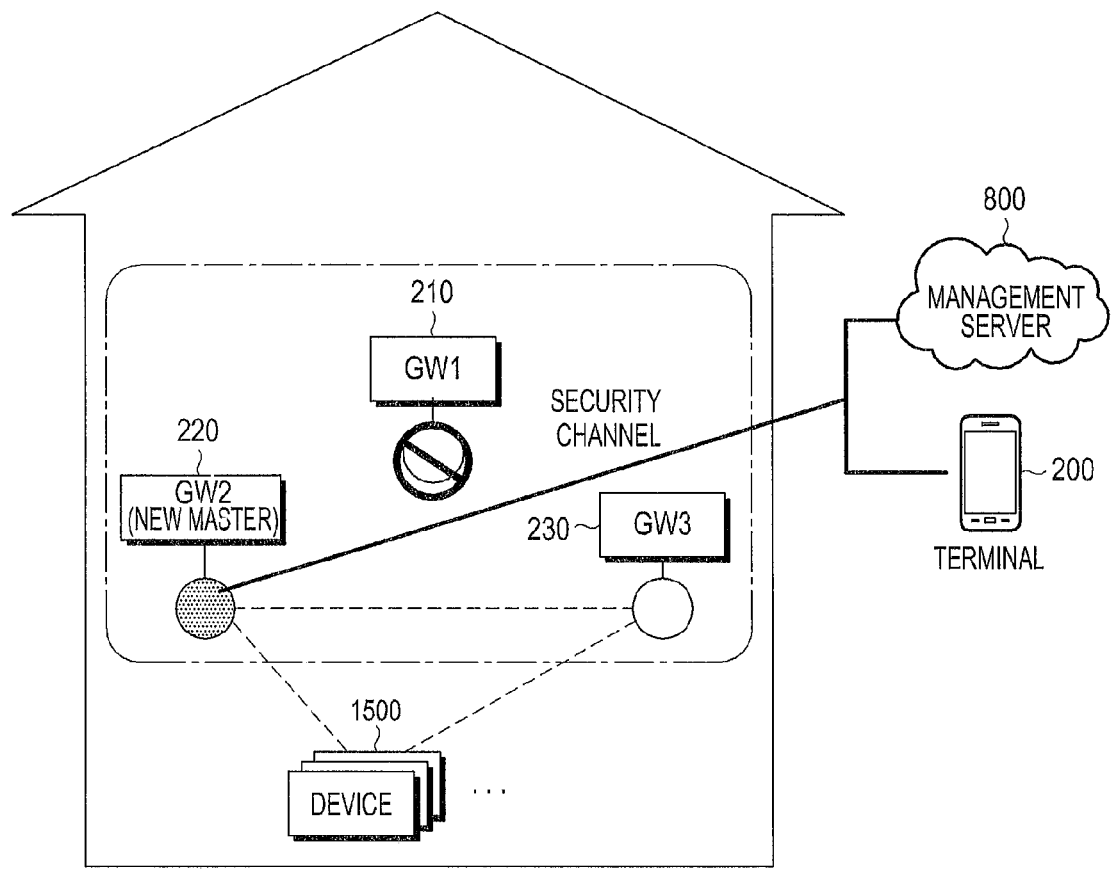
FIG. 19 illustrates an outdoor terminal connected to a new master GW in a wireless communication system, according to an embodiment of the present disclosure.

FIG. 19 illustrates an outdoor terminal being connected to a new master GW in a wireless communication system, according to an embodiment of the present disclosure.

In the embodiment of FIG. 19 where the terminal 200 is located outdoors, the terminal 200 receives a service in the wireless communication system having the configuration of the home network as shown in FIG. 2. Here, an occasion where the master GW is changed from GW 1 210 to GW 2 220 will be examined.

The master GW 1 210, can happen to be powered off, or to be disconnected from the home network while being powered on. In this case, the terminal 200 may not be able to receive a service through the GW 1 120. By way of precaution against this occasion, one of the other GWs except the GW 1 210 can be determined as a new master GW.

For example, if determined as the new master GW 2 220 can send a message to all the GWs in the home network notifying that the GW 2 220 has become a new master GW. The GW 2 220 can also notify the management server 800 that the GW 2 220 has become the new master. For the notification for the GWs and the management server 200, unicast or broadcast communication can be employed.

The terminal 200 can receive information regarding the new mater GW, i.e., GW 2 220 (e.g., an address of the GW 2 220) from the management server 800. The terminal 200 makes connection with the GW 2 220 based on the information regarding the GW 2 220 and receives a service through the GW 2 220.

As the master GW has been changed, the security channel can also be newly created and accordingly, the GW 2 220 can communicate with the terminal 200 on the newly created security channel.

As such, even though an occasion where the terminal 200 may not be offered a service from a master GW happens, the terminal 200 can be able to continuously receive the service from a new master GW and thus keep enjoying the convenience of using the service.

A method for providing a service to the terminal 200 in an environment as shown in FIG. 19 will now be described in detail with reference to FIG. 20.

Figure 20:
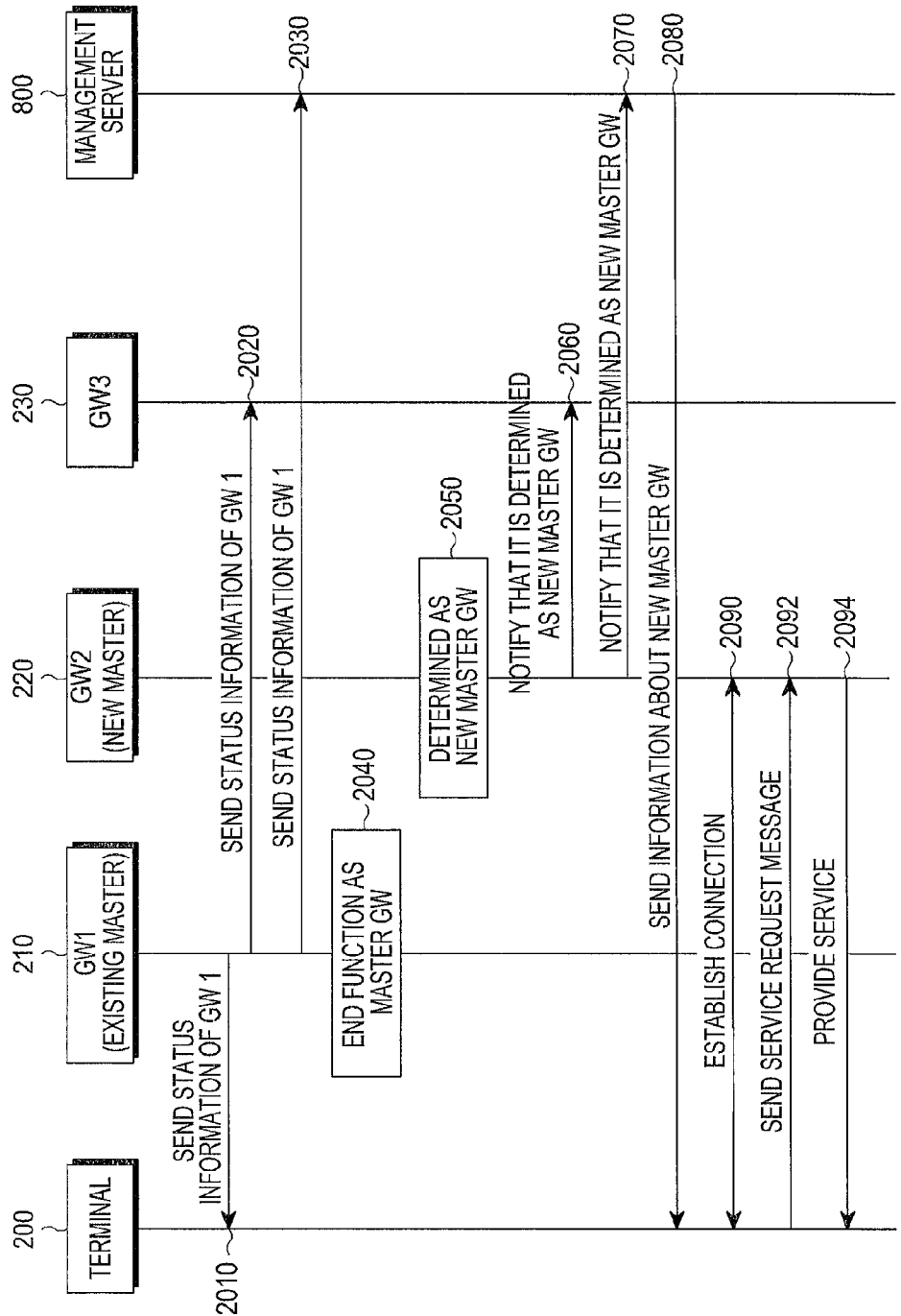
FIG. 20 is a signaling chart illustrating a procedure for an outdoor terminal to receive a service when a master GW has been changed in a wireless communication system, according to an embodiment of the present disclosure.

FIG. 20 is a signaling chart illustrating a procedure of providing a service to an outdoor terminal when a master GW has been changed in a wireless communication system, according to an embodiment of the present disclosure.

Referring to FIG. 20, a master GW, the GW 1 210 can periodically send its status information to the terminal 200, in operation 2010. The GW 1 210 can also send its status information to the GW 2 220 and the GW 3 230 in operation 2020, and send its status information to the management server 800 in operation 2030. The reason of sending the status information is that the GW 1 210 notifies a situation where the GW 1 210 is unable to provide a service (e.g., when the GW 1 210 is powered off, or disconnected from the home network even while being powered on) in time.

If the GW 1 210 ends the function as the master GW in operation 2040, one of the remaining GWs, e.g., the GW 2 220 and GW 2 230 in the home network can be determined as a new master GW according to a predetermined criterion. In the embodiment of FIG. 20, the GW 2 220 is determined as the new master GW in operation 2050.

The GW 2 220 can notify the GW 3 230 that the GW 2 220 is determined as the new master GW, in operation 2060. The GW 2 220 can also notify the management server 800 that the GW 2 220 is determined as the new master GW, in operation 2070.

Upon reception of the notification from the GW 2 220, the management server 800 can send information regarding the new master GW to the terminal 200, in operation 2080. Accordingly, the terminal 200 can recognize that the master GW has been changed and establish connection with the new master GW, GW 2 220. Connection between the terminal 200 and the GW 2 220 can be established via a security channel set up by the GW 2 220.

Once connected to the GW 2 220, the terminal 200 can send a service request message to the GW 2 220, in operation 2092. In response to the service request message, the GW 2 220 can provide a service requested by the terminal 200 to the terminal 200.

Operations of the terminal 200 and GW 2 220 as shown in FIG. 20 will be described in detail with reference to FIGS. 21 and 22, respectively.

Figure 21:
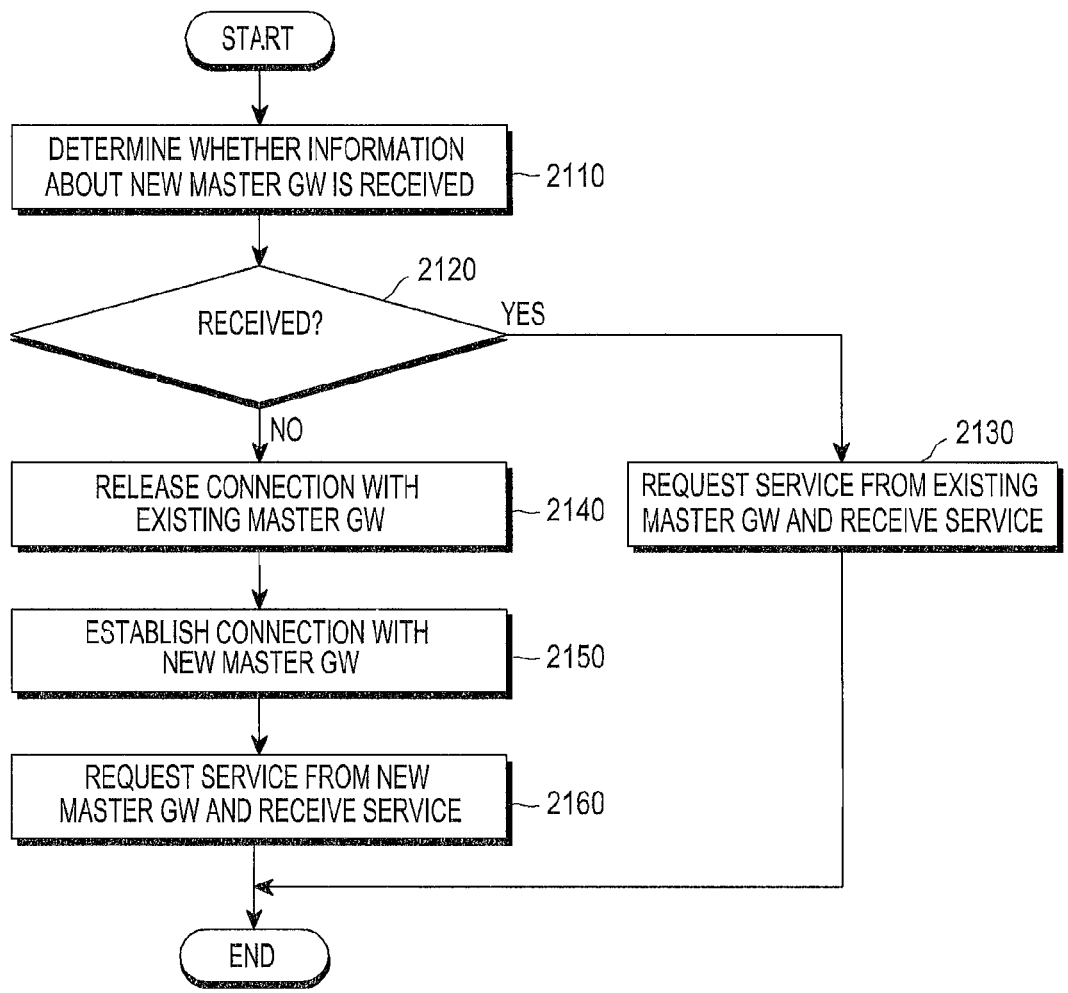
FIG. 21 is a flowchart illustrating operations of a terminal receiving a service when a master GW has been changed in a wireless communication system, according to an embodiment of the present disclosure.

FIG. 21 is a flowchart illustrating operations of an outdoor terminal receiving a service when a master GW has been changed in a wireless communication system, according to an embodiment of the present disclosure.

Referring to FIG. 21, the terminal 200 can determine whether information regarding a new master GW is received, in operation 2110. If it is determined that the information regarding the new master GW is not received in operation 2120, the terminal requests a service from the existing master GW and receive the service in operation 2130.

Otherwise if it is determined that the information regarding the new master GW is received in operation 2120, the terminal 200 can release the connection with the existing master GW in operation 2140 and then establish a connection with the new master GW in operation 2150. The terminal can then request a service from the new master GW and in return receives the service in operation 2160.

Figure 22:
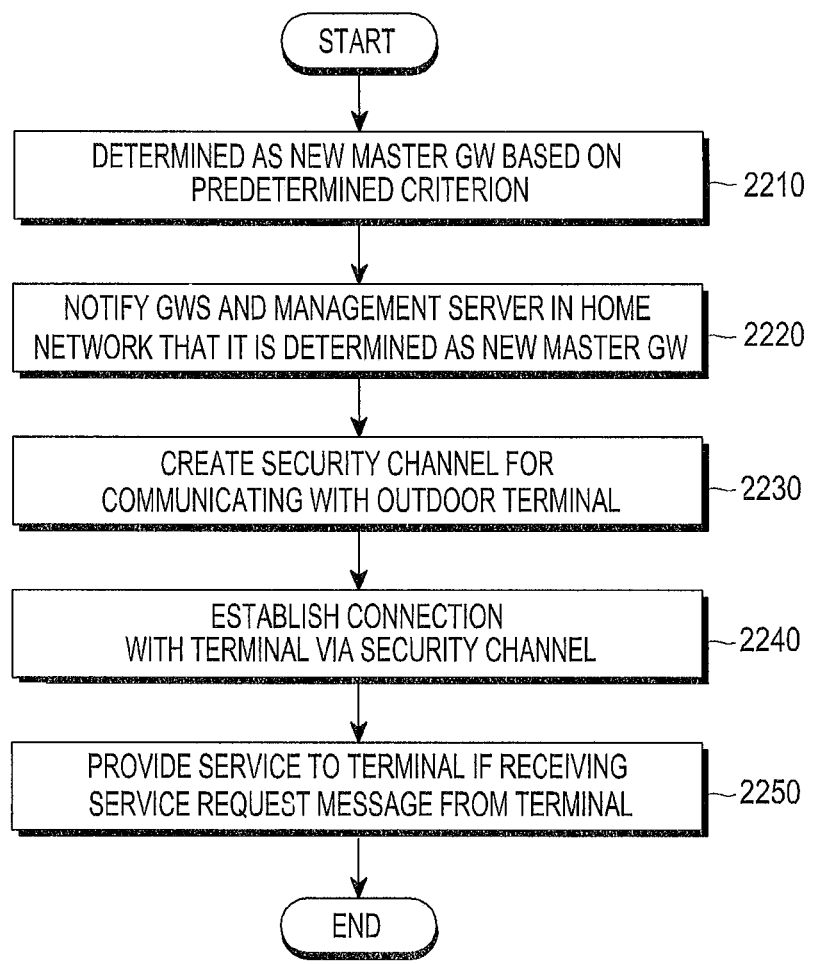
FIG. 22 is a flowchart illustrating operations of a new master GW providing a service to an outdoor terminal in a wireless communication system, according to an embodiment of the present disclosure.

FIG. 22 is a flowchart illustrating operations of a new master GW providing a service to an outdoor terminal in a wireless communication system, according to an embodiment of the present disclosure.

Referring to FIG. 22, once the existing master GW becomes unable to provide a service, one of multiple GWs can be determined as a new master GW according to a predetermined criterion. For example, if the GW 2 220 is determined as the new master GW among the multiple GWs according to the predetermined criterion in operation 2210, the GW 2 220 can notify the GWs and management server 800 in the home network that the GW 2 220 has been determined as the new master GW in operation 2220.

Then, the GW 2 220 can create a security channel to communicate with the terminal 200 located outdoors in operation 2230, and establish a connection with the terminal 200 on the security channel in operation 2240. Upon reception of a service request message from the terminal 200, the GW 2 220 can provide a corresponding service to the terminal 200, in operation 2250.

The embodiments of the present disclosure have an advantage of enabling multiple GWs to work with a device that supports a new protocol by interconnecting physically-separated multiple GWs to perform integrated control over IP and non-IP devices. Also, the embodiments of the present disclosure may provide various services to a terminal through a single GW. Furthermore, the embodiments of the present disclosure may keep securing service availability in a case a particular GW may not offer a service to a terminal, by enabling another GW to offer the service to the terminal for the particular GW.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for sending a service by a first gateway (GW) among multiple GWs in a wireless communication system, the method comprising:
    upon reception of a request for the service from a terminal, determining whether the first GW is able to provide the service;
    if the first GW is not able to provide the service, determining a second GW that is able to provide the service requested by the terminal among the multiple GWs, based on GW management information that includes respective service information regarding different services that the multiple GWs are able to provide;
    requesting the second GW to provide the service requested by the terminal; and
    upon reception of the service from the second GW, forwarding, to the terminal, the service.

2. The method of claim 1, wherein the GW management information comprises at least one of information regarding types of devices connectable to the multiple GWs and information indicating whether the multiple GWs are in a state of being able to provide services.

3. The method of claim 1, wherein the GW management information is created based on the respective service information of other GWs that the first GW received from the other GWs.

4. The method of claim 1, wherein the first GW corresponds to a master GW that is configured to create the GW management information by communicating with the multiple GWs, and forward at least one of the services provided by the multiple GWs to the terminal based on the GW management information.

5. The method of claim 4, wherein the master GW is determined based on at least one of: predetermined priorities of the multiple GWs, magnitudes of IP numbers of the multiple GWs, or transmit signal strengths of the multiple GWs.

6. The method of claim 4, wherein one of the other GWs than the first GW is determined as a new master GW if the first GW is unable to provide the service to the terminal.

7. The method of claim 6, wherein information regarding the new master GW is sent to the terminal.

8. The method of claim 6, wherein the new master GW is determined based on at least one of predetermined priorities of the multiple GWs, magnitudes of IP numbers of the multiple GWs, and transmit signal strengths of the multiple GWs.

9. The method of claim 1, wherein forwarding the service to the terminal comprises sending the service to the terminal on a predetermined security channel, if the terminal is located outdoors.

10. The method of claim 1, wherein the multiple GWs are interconnected on an Internet Protocol (IP) basis and able to communicate with IP-based devices.

11. A method for receiving a service by a terminal in a wireless communication system, the method comprising:
    receiving information regarding a first gateway (GW) from which the terminal receives the service among multiple GWs;
    requesting the service to the first GW based on the information regarding the first GW; and
    receiving the service from the first GW,
    wherein the first GW provides the service to the terminal, based on GW management information that includes respective service information regarding different services that the multiple GWs are able to provide.

12. The method of claim 11, wherein the GW management information comprises at least one of information regarding types of devices connectable to each of the multiple GWs and information indicating whether the multiple GWs are in a state of being able to provide services.

13. The method of claim 11, wherein the GW management information is created based on the respective service information of other GWs that the first GW received from the other GWs.

14. The method of claim 11, wherein the first GW corresponds to a master GW configured to create the GW management information by communicating with the multiple GWs, and forward at least one of the services provided by the multiple GWs to the terminal based on the GW management information.

15. The method of claim 14, wherein the master GW is determined based on at least one of: predetermined priorities of the multiple GWs, magnitudes of IP numbers of the multiple GWs, or transmit signal strengths of the multiple GWs.

16. The method of claim 14, wherein one of the other GWs than the first GW is determined as a new master GW if the first GW is unable to provide the service to the terminal.

17. The method of claim 16, further comprising:
    receiving information regarding the new master GW.

18. The method of claim 16, wherein the new master GW is determined based on at least one of predetermined priorities of the multiple GWs, magnitudes of IP numbers of the multiple GWs, and transmit signal strengths of the multiple GWs.

19. The method of claim 11, wherein receiving the service comprises:
    receiving the service on a predetermined security channel, if the terminal is located outdoors.

20. The method of claim 11, wherein the multiple GWs are interconnected on an Internet Protocol (IP) basis and able to communicate with IP-based devices.

21. A gateway (GW) among multiple GWs in a wireless communication system, the GW comprising:

a receiver configured to receive a request for a service from a terminal;
a controller configured to:
  determine whether the GW is able to provide the service requested by the terminal; and
  if the GW is not able to provide the service, determine a second GW that is able to provide the service among the multiple GWs, based on GW management information that includes respective service information regarding different services that the multiple GWs are able to provide;
a GW interface configure to:
  request the second GW to provide the service requested by the terminal; and
  receive the service from the second GW; and
a transmitter configured to forward the service to the terminal.

22. The GW of claim 21, wherein the GW management information comprises at least one of information regarding types of devices connectable to the multiple GWs and information indicating whether the multiple GWs are in a state of being able to provide services.

23. The GW of claim 21, wherein the GW management information is created based on the respective service information of other GWs that the GW received from the other GWs.

24. The GW of claim 21, wherein the GW is configured to correspond to a master GW configured to create the GW management information by communicating with the multiple GWs, and forward at least one of the services provided by the multiple GWs to the terminal based on the GW management information.

25. The GW of claim 24, wherein the master GW is determined based on at least one of: predetermined priorities of the multiple GWs, magnitudes of IP numbers of the multiple GWs, or transmit signal strengths of the multiple GWs.

26. The GW of claim 24, wherein one of the other GWs than the GW is determined as a new master GW if the GW is unable to provide the service to the terminal.

27. The GW of claim 26, wherein information regarding the new master GW is sent to the terminal.

28. The GW of claim 26, wherein the new master GW is determined based on at least one of predetermined priorities of the multiple GWs, magnitudes of IP numbers of the multiple GWs, and transmit signal strengths of the multiple GWs.

29. The GW of claim 21, wherein the transmitter is configured to send the service to the terminal on a predetermined security channel, if the terminal is located outdoors.

30. The GW of claim 21, wherein the multiple GWs are interconnected on an Internet Protocol (IP) basis and able to communicate with IP-based devices.

31. A terminal in a wireless communication system, the terminal comprising:

a transmitter;
a receiver configured to receive information regarding a first gateway (GW) from which the terminal is configured to receive a service among multiple GWs; and
a controller configured to:
  control the transmitter to request the service to the first GW based on information regarding the first GW; and
  control the receiver to receive the service from the first GW;
wherein the first GW is configured to provide the service to the terminal, based on GW management information that includes respective service information regarding different services that the multiple GWs are able to provide.

32. The terminal of claim 31, wherein the GW management information comprises at least one of information regarding types of devices connectable to the multiple GWs and information indicating whether the multiple GWs are in a state of being able to provide services.

33. The terminal of claim 31, wherein the GW management information is created based on the respective service information of other GWs that the first GW received from the other GWs.

34. The terminal of claim 31, wherein the first GW is configured to correspond to a master GW configured to create the GW management information by communicating with the multiple GWs, and forward at least one of the services provided by the multiple GWs to the terminal based on the GW management information.

35. The terminal of claim 34, wherein the master GW is determined based on at least one of: predetermined priorities of the multiple GWs, magnitudes of IP numbers of the multiple GWs, or transmit signal strengths of the multiple GWs.

36. The terminal of claim 34, wherein one of the other GWs than the first GW is determined as a new master GW if the first GW is unable to provide the service to the terminal.

37. The terminal of claim 36, wherein the receiver is configured to receive information regarding the new master GW.

38. The terminal of claim 36, wherein the new master GW is determined based on at least one of predetermined priorities of the multiple GWs, magnitudes of IP numbers of the multiple GWs, and transmit signal strengths of the multiple GWs.

39. The terminal of claim 31, wherein the receiver is configured to receive the service on a predetermined security channel, if the terminal is located outdoors.

40. The terminal of claim 31, wherein the multiple GWs are interconnected on an Internet Protocol (IP) basis and able to communicate with IP-based devices.

* * * * *